(12) United States Patent
Kadoi et al.

(10) Patent No.: US 7,181,630 B2
(45) Date of Patent: Feb. 20, 2007

(54) UNINTERRUPTED POWER SUPPLY MANAGING SYSTEM DISPLAYS CONNECTION TREE GENERATED FROM CONNECTION INFORMATION BETWEEN INTERRUPTED POWER SUPPLY DEVICE AND LOAD DEVICES RECEIVED FROM LOWER CONTROLLER

(75) Inventors: Hirokazu Kadoi, Tokyo (JP); Fujitaka Togashi, Tokyo (JP); Akinori Miyazaki, Tokyo (JP); Kazuhiko Takano, Tokyo (JP); Hiroyuki Oka, Tokyo (JP)

(73) Assignee: Densei-Lambda K.K., Tokyo (JP)

( * ) Notice: Subject to any disclaimer, the term of this patent is extended or adjusted under 35 U.S.C. 154(b) by 644 days.

(21) Appl. No.: 10/278,359

(22) Filed: Oct. 23, 2002

(65) Prior Publication Data

US 2003/0085624 A1    May 8, 2003

(30) Foreign Application Priority Data

| Oct. 29, 2001 | (JP) | ............................. 2001-330347 |
| Nov. 7, 2001 | (JP) | ............................. 2001-342114 |
| Nov. 7, 2001 | (JP) | ............................. 2001-342466 |
| Jan. 21, 2002 | (JP) | ............................. 2002-011711 |
| Jan. 23, 2002 | (JP) | ............................. 2002-014720 |
| May 28, 2002 | (JP) | ............................. 2002-153262 |
| May 28, 2002 | (JP) | ............................. 2002-153266 |

(51) Int. Cl.
*G06F 1/26*   (2006.01)

(52) U.S. Cl. ...................... 713/300; 713/324; 709/202; 709/229

(58) Field of Classification Search ................ 713/300, 713/340; 709/202, 229
See application file for complete search history.

(56) References Cited

U.S. PATENT DOCUMENTS 5,319,571 A * 6/1994 Langer et al. ............... 713/300

(Continued)

FOREIGN PATENT DOCUMENTS

JP       10-275124       10/1998

(Continued)

OTHER PUBLICATIONS

"A Softwar Managing Clustered Multi Vender Uninterruptible Power Supply on Network", Research Disclosure, Mar. 1999, pp. 1-6.*

(Continued)

*Primary Examiner*—Chun Cao
(74) *Attorney, Agent, or Firm*—Reed Smith LLP

(57) ABSTRACT

An Uninterrupted Power Supply (UPS) managing system is described for managing a plurality of small UPS devices, the small UPS device are connected to power supply routes between wall sockets and load devices. The UPS managing system comprises a plurality of lower controllers provided corresponding to each of small UPS devices or each of groups which is comprising at least two of said small UPS devices; a communication network for connecting a plurality of said lower controllers each other; and a higher controller connected to said communication network. In addition, each of said lower controllers generates connection information between each of its corresponding small UPS device(s) and each of load device(s) which is powered by said corresponding small UPS device(s), and transmits said connection information to said higher controller. The higher controller also receives and stores said connection information from each of said lower controllers and generates and displays a connection tree which is generated from the stored connection information.

12 Claims, 25 Drawing Sheets

U.S. PATENT DOCUMENTS

| | | | |
|---|---|---|---|
| 5,381,554 A * | 1/1995 | Langer et al. ................ 714/14 |
| 5,949,974 A * | 9/1999 | Ewing et al. ............... 709/202 |
| 5,961,604 A * | 10/1999 | Anderson et al. ........... 709/229 |
| 6,195,754 B1 * | 2/2001 | Jardine et al. .............. 713/324 |
| 6,219,703 B1 * | 4/2001 | Nguyen et al. ............. 709/224 |
| 6,865,685 B2 * | 3/2005 | Hammond et al. ......... 713/340 |
| 2003/0033548 A1 * | 2/2003 | Kuiawa et al. ............. 713/300 |
| 2003/0033550 A1 * | 2/2003 | Kuiawa et al. ............. 713/340 |
| 2005/0071699 A1 * | 3/2005 | Hammond et al. ......... 713/300 |

FOREIGN PATENT DOCUMENTS

| | | |
|---|---|---|
| JP | 11-272589 | 10/1999 |
| JP | 11-305881 | 11/1999 |
| JP | 2001-159934 | 6/2001 |
| WO | WO 98/55934 | 12/1998 |
| WO | WO 00/33098 | 1/2000 |
| WO | WO 01/82260 | 11/2001 |

OTHER PUBLICATIONS

FailSafe III and LanSafe III, Version 4.1 Power Management Software User Manual, Apr. 1999.

XP004304645, Jarkowski M., et al. "New Approach for Management Services with a Web Browser", Nov. 10, 1999, Computer Networks, Elsevier Science Publishers B.V., Amsterdam, NL. pp. 2227-2236, ISSN; 1389-1286.

XP008054694, Fushima T. et al., Power Management Software, "LanSafe III" Sanken Technical Report, Sanken Electric Company, Japan, vol. 30, No. 1 Nov. 1998-pp. 40-47, ISSN: 0285-9815.

XP008054695, Iwata T. et al., Power Supply Management Software "Fullback Manager Pro" Sanken Technical Report Sanken Electric Co., Japan, vol. 32, No. 1, 2000, pp. 75-80, ISSN: 0285-9815.

XP008054691, Ishikawa T. et al., "Fullback Series New Option "Fullbacknet Series" for Network Applications", Sanken Technical Report, Sanken Electric Co., Japan, vol. 29, Nov. 1, 1997, (Nov. 1997), pp. 84-93, ISSN: 0285-9815.

* cited by examiner

Fig. 3

INPUT OF MANAGEMENT INFORMATION ON LOAD DEVICE

【SELECTION OF PRESENT INFORMATION】

[REGISTER] [CHANGE] [DELETE]

【CORRECTION OF INFORMATION】

CONNECTION TYPE
CONNECTION NAME
LOCATION
OS NAME
IP ADDRESS
ADMINISTRATOR NAME
USER NAME
CONTACT POINT 1
CONTACT POINT 2
COMMENTS

[END] [STOP]

[OK (O)] [CANCEL (C)] [HELP (H)]

Fig. 9

| TREE SYMBOL | STATE | | | | | |
|---|---|---|---|---|---|---|
| | NORMAL (RECOVERED) | MAJOR TROUBLE | MINOR TROUBLE | POWER FAILURE STOPPAGE | OPERATION STOPPAGE | COMMUNICATION ABNORMALITY |
| UPS | UPS | UPS | UPS | UPS | UPS | UPS |

Fig. 17

| NAME | | | CONTENTS (FUNCTIONS) | SUPPLEMENTARY NOTE | REMARKS |
|---|---|---|---|---|---|
| MAIN ITEM | MIDDLE ITEM | MINOR ITEM | | | |
| UPS GROUP INFORMATION (107) | BASIC INFORMATION | INDEX NUMBER | INDEX NUMBER OF UPS GROUP MANAGEMENT INFORMATION | UNIQUE KEY ITEM | |
| | | RECORD VALIDITY /INVALIDITY FLAG | FLAG INDICATING VALIDITY /INVALIDITY OF THE RECORD  0: INVALID 1: VALID | | |
| | UPS GROUP INFORMATION | UPS GROUP VALIDITY /INVALIDITY FLAG | FLAG INDICATING COMPOSITION OF UPS GROUP 0: STANDALONE COMPOSITION 1: UPS GROUP COMPOSITION | STATUS OF UPS GROUP NAME TREE ICON 0: NORMAL 10: MAJOR TROUBLE 11: MINOR TROUBLE 20: POWER FAILURE STOPPAGE 21: OPERATION STOPPAGE 31: COMMUNICATION ABNORMALITY | |
| | | UPS GROUP NAME | UPS GROUP NAME | | |
| | | TREE ICON STATUS | ← | | |
| | GROUP COMPOSITION INFORMATION | NUMBER OF UPS MEMBER | NUMBER OF UPS MEMBER IN UPS GROUP 0 TO 63 | | |
| UPS CONTROLLER INFORMATION (108) | CONTROLLER INFORMATION | COMPUTER NAME | COMPUTER NAME OF UPS CONTROLLER | | |
| | | IP ADDRESS | IP ADDRESS OF UPS CONTROLLER | | |
| | | PORT NUMBER | PORT NUMBER USED IN UPS CONTROLLER (MONITOR) | | |
| | | ACCESS CODE | ACCESS CODE OF CONTROLLER | | |
| CONNECTED UPS INFORMATION (105, 106) | UPS INFORMATION | UPS NAME | MODEL NAME OF CONNECTED UPS | STATUS OF UPS TREE ICON 0: NORMAL 10: MAJOR TROUBLE 11: MINOR TROUBLE 20: POWER FAILURE STOPPAGE 21: OPERATION STOPPAGE 31: COMMUNICATION ABNORMALITY | |
| | | TREE ICON STATUS | ← | | |
| | | SERIAL NUMBER | SERIAL NUMBER OF CONNECTED UPS | | |
| | | PRODUCT NUMBER | PART NUMBER OF CONNECTED UPS | | |
| | | FIRMWARE VERSION | FIRMWARE VERSION OF CONNECTED UPS | | |
| | | UPS TYPE | UPS TYPE IS SET | | |
| | | USED COMMUNICATION PORT | ← | COMMUNICATION PORT USED IN CONNECTED UPS 0: UNKNOWN 1: COM1 2: COM2 3: COM3 4: COM4 | |
| | UPS MANAGEMENT INFORMATION | LOCATION | LOCATION OF CONNECTED DEVICE | | |
| | | OS NAME | OS NAME | | |
| | | SOFTWARE NAME | "UPS MONITOR" + VERSION | | |
| | | IP ADDRESS | IP ADDRESS OF CONNECTED DEVICE | | |
| | | ADMINISTRATOR NAME /USER NAME | ADMINISTRATOR NAME /USER NAME OF CONNECTED DEVICE | | |
| | | CONTACT POINT | CONTACT POINT | | |
| LOAD SEGMENT INFORMATION n (109) | LOAD SEGMENT INFORMATION | LOAD SEGMENT NUMBER | LOAD SEGMENT NUMBER 0: WHOLE UPS 1 TO 63: NUMBER OF EACH LOAD SEGMENT | | n:0~63 |
| | | LOAD SEGMENT VALIDITY /INVALIDITY FLAG | ← | FLAG INDICATING VALIDITY/INVALIDITY OF LOAD SEGMENT MANAGEMENT INFORMATION INDEX NUMBER 0: INVALID 1: VALID | |
| | | LOAD SEGMENT MANAGEMENT INFORMATION INDEX NUMBER | INDEX NUMBER OF LOAD SEGMENT MANAGEMENT INFORMATION | | |

UPS GROUP MANAGEMENT INFORMATION

Fig. 18

| NAME | | | CONTENTS (FUNCTIONS) | SUPPLEMENTARY NOTE | REMARKS |
|---|---|---|---|---|---|
| MAIN ITEM | MIDDLE ITEM | MINOR ITEM | | | |
| MANAGEMENT INFORMATION | LOAD SEGMENT MANAGEMENT INFORMATION | | | | |
| | MANAGEMENT INFORMATION | INDEX NUMBER | INDEX NUMBER OF CONNECTED LOAD DEVICE MANAGEMENT INFORMATION | UNIQUE KEY ITEM | |
| | | RECORD VALIDITY /INVALIDITY FLAG | FLAG INDICATING VALIDITY /INVALIDITY OF THE RECORD 0: INVALID 1: VALID | | |
| | | LOAD SEGMENT ID | ID OF LOAD SEGMENT  0: WHOLE UPS 1 TO 63: LOAD SEGMENT NUMBER IN DISPLAYING EACH SEGMENT | | |
| | ICON INFORMATION | TREE ICON ID | ID OF TREE ICON 6: WHOLE UPS  7: LOAD SEGMENT n | | |
| | | TREE ICON STATUS | STATUS OF TREE ICON  0: NORMAL 10: MAJOR TROUBLE 11: MINOR TROUBLE 20: POWER FAILURE STOPPAGE 21: OPERATION STOPPAGE 31: COMMUNICATION ABNORMALITY | | |
| | NUMBER OF CONNECTED DEVICE | | TOTAL NUMBER OF DEVICE CONNECTED TO SEGMENT 0 TO 10 | | ALL OF 7 AND SUBSEQUENT ITEM NUMBERS ARE INVALID WHEN TOTAL NUMBER IS 0 |
| | CONNECTED DEVICE INFORMATION | CONNECTED DEVICE VALIDITY /INVALIDITY FLAG | FLAG INDICATING VALIDITY /INVALIDITY OF CONNECTED DEVICE INFORMATION 0: INVALID 1: VALID | | n:1~10 |
| CONNECTED DEVICE INFORMATION n | | CONNECTED DEVICE INFORMATION | INDEX NUMBER OF CONNECTED DEVICE INFORMATION | | |

Fig. 19

| NAME | | | UPS GROUP MANAGEMENT INFORMATION 114 | CONTENTS (FUNCTIONS) | REMARKS |
|---|---|---|---|---|---|
| MAIN ITEM | MIDDLE ITEM | MINOR ITEM | | | UNIQUEKEY ITEM |
| WORK GROUP INFORMATION 115 | BASIC INFORMATION | INDEX NUMBER | INDEX NUMBER OF WORK GROUP MANAGEMENT INFORMATION 0 TO 15 | | |
| | | RECORD VALIDITY /INVALIDITY FLAG | FLAG INDICATING VALIDITY/INVALIDITY OF THE RECORD 0: INVALID 1: VALID | | |
| | | UPS WORK GROUP NAME | UPS WORK GROUP NAME | | STATUS OF UPS WORK GROUP NAME TREE ICON 0: NORMAL 10: MAJOR TROUBLE 11: MINOR TROUBLE 20: POWER FAILURE STOPPAGE 21: OPERATION STOPPAGE 31: COMMUNICATION ABNORMALITY |
| | | TREE ICON STATUS | | | |
| | MONITORING INFORMATION | NUMBER OF SUBORDINATE UPS GROUP | NUMBER OF UPS GROUP EXISTING IN UPS WORK GROUP 0 TO 64 | | |
| | | REDUNDANCY MONITORING EXECUTION FLAG | FLAG INDICATING WHETHER REDUNDANCY MONITORING IS EXECUTED IN UPS WORK GROUP 0: NOT EXECUTED 1: EXECUTED | | UNUSED IN STEP 1 |
| | | MUTUAL NOTIFICATION EXECUTION FLAG | FLAG INDICATING WHETHER MUTUAL NOTIFICATION IS EXECUTED IN UPS WORK GROUP 0: NOT EXECUTED 1: EXECUTED | | |
| WORK GROUP CONTROLLER INFORMATION 113 n | CONTROLLER INFORMATION | CONTROLLER VALIDITY /INVALIDITY FLAG | FLAG INDICATING VALIDITY/INVALIDITY OF WORK GROUP CONTROLLER 0: INVALID 1: VALID | | n=1: CONTROLLER ITSELF N=2: REDUNDANCY-MONITORED CONTROLLER |
| | | TREE ICON STATUS | | | |
| | | WORK GROUP CONTROLLER IP ADDRESS | IP ADDRESS OF WORK GROUP CONTROLLER | | |
| | | WORK GROUP CONTROLLER PORT NUMBER 1 | PORT NUMBER USED IN RECEIVING PROCESSING | | TATUS OF UPS WORK GROUP CONTROLLER TREE ICON 0: NORMAL 10: MAJOR TROUBLE 11: MINOR TROUBLE 20: POWER FAILURE STOPPAGE 21: OPERATION STOPPAGE 31: COMMUNICATION ABNORMALITY |
| | | WORK GROUP CONTROLLER PORT NUMBER 2 | PORT NUMBER USED IN TRANSMITTING PROCESSING | | |
| | | WORK GROUP CONTROLLER COMPUTER NAME | COMPUTER NAME OF WORK GROUP CONTROLLER | | |
| | | UPS WORK GROUP CONTROLLER OS NAME | OS NAME OF UPS WORK GROUP CONTROLLER | | |
| | | SOFTWARE NAME | "UPS WORK GROUP MONITOR" + VERSION | | |
| | | ACCESS CODE | ACCESS CODE OF UPS WORK GROUP CONTROLLER | | |
| | CONTROLLER PC MANAGEMENT INFORMATION | REDUNDANCY MONITORING PRIORITY CONTROL FLAG | | | PRIORITY ORDER IN MONITORING REDUNDANCY IS INDICATED 0: INVALID (REDUNDANCY MONITORING NOT EXECUTED) 1: VALID (REDUNDANCY MONITORING EXECUTED) |
| | | COMPUTER NAME | COMPUTER NAME | | |
| | | LOCATION | LOCATION | | |
| | | OS NAME | OS NAME | | |
| | | SOFTWARE NAME | "UPS WORK GROUP MONITOR" + VERSION | | |
| | | IP ADDRESS | IP ADDRESS | | |
| | | ADMINISTRATOR NAME /USER NAME | ADMINISTRATOR NAME /USER NAME OF CONNECTED DEVICE | | |
| | | CONTACT POINT | CONTACT POINT | | |
| WORK GROUP SUBORDINATE NODE INFORMATION n 116 | SUBORDINATE INFORMATION INDEX | SUBORDINATE INFORMATION FLAG | FLAG RELATED TO SUBORDINATE INFORMATION n:1~64 0: INVALID 1: UPS GROUP | | |
| | | SUBORDINATE INFORMATION INDEX NUMBER | INDEX NUMBER OF UPS GROUP MANAGEMENT INFORMATION IS SHOWN WHEN SUBORDINATE INFORMATION FLAG INDICATES 2 | | |

Fig. 20

| NAME | UPS GROUP MANAGEMENT INFORMATION | | | CONTENTS (FUNCTIONS) | SUPPLEMENTARY NOTE | REMARKS |
|---|---|---|---|---|---|---|
| MAIN ITEM | MIDDLE ITEM | | MINOR ITEM | | | |
| UPS DOMAIN INFORMATION | BASIC INFORMATION | | DOMAIN VALIDITY /INVALIDITY FLAG | FLAG INDICATING VALIDITY/INVALIDITY OF UPS DOMAIN 0: INVALID 1: VALID | INVALID WHEN NUMBER OF TOTAL SUBORDINATE NODES IS 0 | DOMAIN EXPLORER IS NOT ALLOWED TO START UP WHEN INVALID |
| | | | UPS DOMAIN NAME | UPS DOMAIN NAME | | |
| | | | TREE ICON STATUS | STATUS OF UPS DOMAIN NAME TREE ICON 0: NORMAL 10: MAJOR TROUBLE 11: MINOR TROUBLE 20: POWER FAILURE STOPPAGE 21: OPERATION STOPPAGE 31: COMMUNICATION ABNORMALITY | | |
| | | | DOMAIN CONTROLLER IP ADDRESS | IP ADDRESS OF DOMAIN CONTROLLER | | |
| | | | DOMAIN CONTROLLER PORT NUMBER 1 | PORT NUMBER USED IN RECEIVING PROCESSING | | |
| | | | DOMAIN CONTROLLER PORT NUMBER 2 | PORT NUMBER USED IN TRANSMITTING PROCESSING | | |
| | | | DOMAIN CONTROLLER COMPUTER NAME | COMPUTER NAME OF DOMAIN CONTROLLER | | |
| | MONITORING INFORMATION | | NUMBER OF TOTAL SUBORDINATE NODES | NUMBER OF TOTAL SUBORDINATE NODES MANAGED BY UPS DOMAIN CONTROLLER 0 TO 255 | | NUMBER OF SUBORDINATE WORK GROUP + NUMBER OF SUBORDINATE UPS GROUP |
| | | | NUMBER OF SUBORDINATE WORK GROUP | NUMBER OF WORK GROUP EXISTING IN UPS DOMAIN 0 TO 16 | | |
| | | | NUMBER OF SUBORDINATE UPS GROUP | NUMBER OF UPS GROUP EXISTING IN UPS DOMAIN 0 TO 255 | | |
| | | | REDUNDANCY MONITORING EXECUTION FLAG | FLAG INDICATING WHETHER REDUNDANCY MONITORING IS EXECUTED 0: NOT EXECUTED 1: EXECUTED | | |
| UPS DOMAIN CONTROLLER INFORMATION n | CONTROLLER INFORMATION | | CONTROLLER VALIDITY /INVALIDITY FLAG | FLAG INDICATING VALIDITY/INVALIDITY OF UPS DOMAIN CONTROLLER 0: INVALID 1: VALID | | n=1: CONTROLLER ITSELF n=2: REDUNDANCY-MONITORED CONTROLLER |
| | | | TREE ICON STATUS | STATUS OF UPS DOMAIN CONTROLLER TREE ICON 0: NORMAL 10: MAJOR TROUBLE 11: MINOR TROUBLE 20: POWER FAILURE STOPPAGE 21: OPERATION STOPPAGE 31: COMMUNICATION ABNORMALITY | | |

Fig. 21

| | | | | |
|---|---|---|---|---|
| UPS DOMAIN CONTROLLER INFORMATION n | CONTROLLER INFORMATION | DOMAIN CONTROLLER IP ADDRESS | | IP ADDRESS OF DOMAIN CONTROLLER |
| | | DOMAIN CONTROLLER PORT NUMBER 1 | | PORT NUMBER USED IN RECEIVING PROCESSING |
| | | DOMAIN CONTROLLER PORT NUMBER 2 | | PORT NUMBER USED IN TRANSMITTING PROCESSING |
| | | DOMAIN CONTROLLER COMPUTER NAME | | COMPUTER NAME OF DOMAIN CONTROLLER |
| | | UPS DOMAIN CONTROLLER OS NAME | | OS NAME OF UPS DOMAIN CONTROLLER |
| | | SOFTWARE NAME | | "UPS DOMAIN MONITOR" + VERSION |
| | | ACCESS CODE | | ACCESS CODE OF DOMAIN CONTROLLER |
| | | DOMAIN CONTROLLER COMPOSITION INFORMATION | | STATE OF COMPOSITION OF UPS DOMAIN CONTROLLER<br>1: DOMAIN CONTROLLER ONLY<br>5: DOMAIN CONTROLLER + UPS CONTROLLER<br>7: DOMAIN CONTROLLER + WORK GROUP CONTROLLER + UPS CONTROLLER |
| | CONTROLLER PC MANAGEMENT INFORMATION | | | SAME AS UPS WORK GROUP |
| | MANAGEMENT ITEM IN DOMAIN | ID IN DOMAIN | | MANAGEMENT ID ADDED IN DOMAIN MONITOR<br>0 TO 254 | n:1~255 |
| | | MANAGEMENT STATUS | | MANAGEMENT STATUS OF EACH NODE<br>000: INITIAL STATE  101: STARTING<br>201: NORMAL MONITORING<br>202: COMPOSITION INFORMATION CHANGING<br>301: COMMUNICATION ABNORMALITY<br>302: COMMUNICATION ABNORMALITY LASTING<br>401: OPERATION STOPPAGE  500: UNKNOWN<br>402: POWER FAILURE STOPPAGE | 000 IS SET BEFORE INITIAL CONNECTION AND WHEN SUBORDINATE NODE IS DELETED. 100 AND HIGHER VALUES ARE USED FOR MANAGEMENT AT INITIAL CONNECTION AND THEREAFTER |
| DOMAIN SUBORDINATE NODE INFORMATION n | SUBORDINATE INFORMATION INDEX | SUBORDINATE INFORMATION FLAG | | FLAG RELATED TO SUBORDINATE INFORMATION<br>0: INVALID  1: UPS WORK GROUP  2: UPS GROUP |
| | | SUBORDINATE INFORMATION INDEX NUMBER | | 1: UPS WORK GROUP MANAGEMENT INFORMATION<br>2: UPS GROUP MANAGEMENT INFORMATION |

117

119

UNINTERRUPTED POWER SUPPLY MANAGING SYSTEM DISPLAYS CONNECTION TREE GENERATED FROM CONNECTION INFORMATION BETWEEN INTERRUPTED POWER SUPPLY DEVICE AND LOAD DEVICES RECEIVED FROM LOWER CONTROLLER

BACKGROUND OF THE INVENTION

1. Field of the Invention

The present invention relates to an Uninterrupted Power Supply managing system, managing method, and program, for managing small Uninterrupted Power Supply devices connected to power supply routes between wall sockets and load devices and/or large Uninterrupted Power Supply devices connected to power supply routes between power source systems such as electric power plant and wall sockets. Another invention of this application relates to an electric device managing system, for managing a plurality of electric devices such as intelligent tap devices and communication devices, which are installed dispersedly.

2. Description of the Related Art

In recent years, electric load devices such as computers have been widespread to offices and homes. As the computers become widespread, a case has been also increased, in which the computers are connected to each other via communication devices such as communication routers, to mutually transmit/receive information between the computers. For a power supply system, it is more important to supply stable power to the load devices such as the computers and the communication devices.

A small Uninterrupted Power Supply (UPS) device is installed in a power supply system, to supply stable power to the load devices.

The small UPS device is connected to a power supply route between a wall socket and the load device(s) such as the computer(s). When power from the wall socket is in normal condition, the small UPS device supplies the wall socket power to the load device(s). While, when the power from the wall socket is in abnormal condition, the small UPS device supplies power to the load device(s), which is charged in an internal battery of the small UPS device. With this operation of the small UPS device, the load device(s) can keep on working without being affected by the abnormal condition of the wall socket power, even when the power from the wall socket has lapsed into the abnormal condition.

However, to back up the dispersedly installed computers and the dispersedly installed communication devices with the small UPS devices, particularly in an office or the like where a large number of the computers are connected to each other via a large number of the communication devices, a large number of the small UPS devices have to be installed in the power supply system dispersedly, according to each of the locations of the computers and the communication devices.

When a large number of the small UPS devices are used dispersedly as described above, an administrator who manages the small UPS devices has to visit each of the locations where each of the small UPS devices is installed, and has to check each of the small UPS devices one by one, in order to confirm the operating state and the setting of each of the small UPS devices.

Further, a managing system has been developed, in which a plurality of the small UPS devices and a computer are connected via a communication network. The administrator can confirm each of the operating states and the settings of a plurality of the small UPS devices, on the computer. However, even if using the computer, the administrator has to call each of a plurality of the small UPS devices from the computer one by one, and has to check them one by one on the computer. In addition, as it is very important thing, the administrator should know all of the installed small UPS devices in advance, before calling each of a plurality of the small UPS devices from the computer. Therefore, the administrator has to regularly walk around and thoroughly in offices or buildings where the small UPS devices are installed, to check all of the existing small UPS devices perfectly. It is substantially impossible to do it by an administrator.

There are other electric devices, which are connected to the wall sockets and dispersedly installed, and thus whose total existence is difficult to understand, such as intelligent tap devices and communication devices.

It should be noted that a large Uninterrupted Power Supply (UPS) device is connected to a power supply route between power source system(s) such as electric power plant, such as a water-storage dam plant, a thermal power generating plant, etc, and wall sockets. When the electric power from the power source system(s) is in abnormal condition, the large UPS device supplies electric power to the load devices connected to the wall sockets, in place of the electric power from the power source system(s).

SUMMARY OF THE INVENTION

The present invention has been made to solve the problems described above, and its object is to obtain an Uninterrupted Power Supply managing system, managing method, and program, capable of collecting and centrally managing a plurality of small Uninterrupted Power Supply devices, which are connected to wall sockets and whose total existence is difficult to understand.

An object of another invention is to obtain a managing system, capable of collecting and centrally managing a plurality of electric devices, which are connected to wall sockets and whose total existence is difficult to understand.

An Uninterrupted Power Supply (UPS) device managing system for managing a plurality of small UPS devices connected to a power supply routes between wall sockets and load devices according to the present invention comprises: a plurality of lower controllers provided corresponding to each of the small UPS devices or each of groups which is comprising at least two of the small UPS devices; a communication network for connecting a plurality of the lower controllers each other; and a higher controller connected to the communication network, wherein each of the lower controllers generates connection information between each of its corresponding small UPS device(s) and each of the load device(s) which is powered by the corresponding small UPS device(s), and transmits the connection information to the higher controller, and wherein the higher controller receives and stores the connection information from each of the lower controllers, and generates and displays a connection tree which is generated from the stored connection information.

Adapting this configuration, the connection information on a plurality of the small UPS devices is transmitted from each of the lower controllers to the higher controller. The higher controller stores the connection information on each of the small UPS devices, and generates the connection tree to display from the stored connection information. Therefore, with the displayed connection tree on the higher controller, an administrator, who manages a plurality of the small UPS devices, can understand all of the dispersedly installed small UPS devices collectively and centrally, and all of the dispersed load devices, which are dispersedly installed and powered by the small UPS devices.

In the UPS managing system according to the present invention, at least one of the lower controllers is registered therein device information on the load device(s) which is/are powered by the corresponding small UPS device(s), and generates the connection information from the device information.

Adopting this configuration, only by registering the device information on the load device(s) to the lower controller(s), which is/are provided corresponding to the small UPS device(s), the load device(s) can be displayed in the connection tree of the higher controller. Therefore, the administrator or the assistant of him/her can resistor the device information at each place where the small UPS devices and the corresponding lower controllers are installed, as confirming the connection of them.

In the UPS managing system according to the present invention, at least one of the load devices transmits device information on itself to the lower controller which is corresponding to the small UPS device which powers it, and the lower controller, which receives the device information, generates the connection information from the device information.

Adopting this configuration, the load device(s) transmits its device information to the lower computer, which is corresponding to the small UPS device, which powers the load device(s). The lower controller generates the connection information from the received device information. Therefore, the administrator or the assistant of him/her dose not register the load device information by himself/herself.

In the UPS managing system according to the present invention, at least one of the lower controllers is joined in a housing with the corresponding small UPS device.

Adopting this configuration, the small UPS device and the lower controller can be provided in a one-to-one relationship. Therefore, the administrator or the assistant of him/her dose not install the lower controller by himself/herself. Thus, it reduces the possibility to forget to install the lower controller or to connect the lower controller and the small UPS device(s), rather than the lower controller and the corresponding small UPS device are installed separately.

Further, even when there is no computer near the small UPS device, the lower controller can be easily installed. Furthermore, by joining the lower controller and the small UPS device in a housing, the lower controller is designed exclusively for it. Accordingly, it also reduces the possibility of hang-up or stoppage of the lower controller, rather than realizing the lower computer with a general-purpose computer. Thus, the lower controller can transmit the connection information more stably.

In the UPS managing system according to the present invention, each of the lower controllers is registered therein destination information on the higher controller in the communication network as a transmitting destination, and transmits all of the connection information in a communication to the transmitting destination; and the higher controller receives and stores all of the connection information in each of the communication with link information which is unique at least within a plurality of the lower controllers, stores a link list of the link information, generates the connection tree firstly by classifying each of the small UPS devices on the link information and the link list and secondary by classifying each of the load devices on the connection information, and displays the connection tree.

Adopting this configuration, each of the lower controllers transmits all of the connection information to the registered transmitting destinations in a communication. The higher controller stores receives and stores all of the connection information in each of the communication with link information, which is unique at least within a plurality of the lower controllers, and stores a link list of the link information. Therefore, only by registering transmitting destination in each of lower controllers, the connection tree can be displayed on the higher controller.

In addition, the transmitting destination of the connection information is registered in each of the lower controllers one by one. And each of the lower controllers transmits the connection information spontaneously. Accordingly, even when the administrator do not understand all of the small UPS devices and all of the lower controllers, by his/her assistant registering the transmitting destination in each of lower controller locally, the administrator can understand all of the small UPS devices in the higher controller.

In the UPS managing system according to the present invention, each of the lower controllers repeatedly transmits the connection information, which consists of device information on all of the corresponding small UPS devices and all of the load devices, which are powered by the corresponding small UPS devices, and the higher controller receives and stores all of the connection information in each of the communication in a continuous memory area, which is defined at the first receiving time from each of the lower controllers and whose storage capacity is bigger than the data amount of the connection information in the first receiving time.

Adopting this configuration, when receiving the first connection information from each of the lower controllers, the higher controller stores each of the connection information in a communication in a continuous memory area. The continuous memory area is reserved in the first receiving order. Therefore, the higher controller dose not need to reserve a continuous memory area whenever receiving new connection information. Thus, the higher controller can store all of a plurality of the connection information, even if the lower controllers transmit the connection information continuously to the higher controller.

Further, each of the continuous memory areas has bigger storage capacity than the data amount of the connection information in the first receiving time. Therefore, even if the number of the load device(s) is increased after the first connection information being transmitted, and the data amount of the connection information in the communication is increased after the continuous memory areas is reserved, the higher controller can store all of the amount increased connection information in the reserved continuous memory area. Therefore, the higher controller dose not need to reserve a new continuous memory area to store the amount increased connection information. Thus, the higher controller can store all of a plurality of the connection information, even if the lower controllers transmit the connection information continuously to the higher controller, and even if the data amount of the connection information is increased.

In addition, the higher controller does not need a new continuous memory area, unused continuous memory area is not appearing in the memory. Thus, the wasting of memory is reduced.

Furthermore, in the higher controller, each of the connection information is stored in a reserved continuous memory area. Accordingly, the higher controller can read all of the connection information on the small UPS device(s), just reading from the reserved and minimum continuous memory area, even though the number of the load device(s) is increased. As a result, the higher controller can understand each of the connection of the small UPS devices quickly, and displays the connection tree very quickly.

In the UPS managing system according to the present invention, at least one of the lower controllers is registered therein destination information on the lower controller in the communication network as the transmitting destination, which is selected from the other the lower controllers, and the lower controller, which receives the connection information from the other lower controller(s), transmits in the communication both of the connection information on its corresponding small UPS device(s) and received connection information.

Adopting this configuration, the other lower controller transmits the received connection information with its connection information in a communication. Connection information is transmitted via other lower controller to the higher controller. Therefore, the higher controller does not need to receive all of the connection information separately. And the higher controller dose not need to connect with every small UPS devices. As a result, the overhead time for establishing communications is reduced, and the total communication time and the load of the higher controller is reduced.

Further, the connection information on a plurality of the small UPS devices can be collectively displayed in the connection tree. Accordingly, in a case in which, for example, one small UPS device backs up a main unit of a computer; another small UPS device backs up a database accessed by the computer; and these small UPS devices are collaboratively operated, connection information can be transmitted from a lower controller corresponding to one small UPS device to a lower controller corresponding to the other small UPS device. As a result, it can be understood that a plurality of these small UPS devices are collaboratively operated in the displayed connection tree.

In the UPS managing system according to the present invention, at least a middle controller connected to the communication network is provided, at least two of the lower controllers are registered therein destination information on the middle controller in the communication network as the transmitting destination, and each of the middle controller(s) transmits all of received connection information in a communication.

Adopting this configuration, connection information from at least two lower controllers is transmitted via middle controller to the higher controller. The middle controller transmits that connection information to the higher controller in a communication. Therefore, the higher controller can receive the connection information from at least two lower controllers in a communication. As a result, the total communication time and the load of the higher controller are reduced.

In the UPS managing system according to the present invention, each of the lower controllers repeatedly transmits operating state information on its corresponding small UPS device(s) to the registered transmitting destination, and the higher controller receives and stores the operating state information and a plurality of display images, each of which is associated with each of operating states of the small UPS device, and repeatedly selects one of the display images corresponding to the operating state information, to display the selected display image in the connection tree.

Adopting this configuration, the latest operating state of a plurality of the small UPS devices can also be displayed in the connection tree. Therefore, the operating states of all the small UPS devices can be collectively and easily understood without checking sequentially each of the operating states of a plurality of small UPS devices one by one.

In the UPS managing system according to the present invention, each of the lower controllers transmits its destination information in the communication network to the transmitting destination, and the higher controller receives and stores the destination information, and when one of the small UPS device is selected in the connection tree, communicates with the selected lower controller using the stored destination information, to obtain operating state information or setting information on the selected lower controller, and displays the obtained information in or with the connection tree.

Adopting this configuration, the higher controller can obtain the operating state information or the setting information on the selected small UPS device from its corresponding lower controller. In addition, the higher controller displays the operating state information or the setting information in or with the connection tree. Accordingly, at any timing, the latest operating state or setting state of the small UPS devices can be understood with the higher controller. As a result, for example, only by selecting the small UPS device after having executed a control or a setting to it, administrator can check the selected small UPS device works properly on the control or the setting.

In the UPS managing system according to the present invention, each of the lower controllers transmits its destination information in the communication network to the transmitting destination, the higher controller receives and stores the destination information, and when one of the small UPS device is selected in the connection tree and setting information or control information is inputted, transmits the inputted information to the lower controller, which is corresponding with the selected small UPS device, using the stored destination information, and the lower controller, which receives the inputted information, applies the inputted information to the selected small UPS device.

Adopting this configuration, the higher controller transmits the control information or the setting information to each of the lower controllers. Each of the lower controllers executes the setting process or the controlling process based on the setting information or control information to its corresponding small UPS device(s). Therefore, administrator can set or control all of the small UPS devices with the higher controller, even though the small UPS devices are installed dispersedly.

In the UPS managing system according to the present invention, each of the lower controllers repeatedly transmits operating state information on its corresponding small UPS device(s) and its destination information in the communication network to the transmitting destination, the higher controller receives and stores the operating state information and the lower controller's destination information; displays a first frame in which the connection tree is displayed, and a second frame in which operating state information, setting information and control information on the selected small UPS device in the connection tree are displayed by turns; and when the setting information or the control information is inputted in the second frame, transmits the inputted information to the lower controller, which is corresponding with the selected small UPS device, using the stored destination information; and the lower controller, which receives the inputted information, applies the inputted information to the selected small UPS device.

Adopting this configuration, the higher controller displays the connection tree in the first frame, and simultaneously displays operating state information, setting information or control information on the selected small UPS device in the connection tree by turns in the second frame. Therefore, for example, it is possible to display the operating state information on selected small UPS device in the second frame, or to input the setting information or the control information in the second frame, while the connection tree is displayed in the first frame. As a result, the administrator can constantly understand the whole of a plurality of the small UPS devices, even when he/she executes various kinds of operation.

In the UPS managing system according to the present invention, the higher controller collects or is registered therein connection information on power supply routes between power source systems and wall sockets including at least a large UPS device, and generates a power supply route diagram including the large UPS device(s), the small UPS devices, and the load devices.

Adopting this configuration, the higher controller can generate the power system diagram including the large UPS device, the small UPS device, and the load device. Therefore, the whole electric power supply route from the large UPS device to the load device(s) can be understood by the administrator, even though he/she does not know about the internal electric power supply route within the building or the like, or even though he/she does not know about the power supply routes from wall sockets and load devices.

An electric device managing system according to the present invention comprises, a plurality of lower controllers provided corresponding to each of the electric devices or each of groups which is comprising at least the two electric devices; a communication network for connecting a plurality of the lower controllers each other; and a higher controller connected to the communication network, each of the lower controllers generates connection information between each of its corresponding electric device(s), and transmits the connection information to the higher controller, and the higher controller receives and stores the connection information from each of the lower controllers, and generates and displays a connection tree which is generated from the stored connection information.

Adapting this configuration, the connection information on a plurality of the electric devices is transmitted from each of the lower controllers to the higher controller. The higher controller stores the connection information on each of the electric devices and combines the stored connection information to display the connection tree. Therefore, with the displayed connection tree on the higher controller, an administrator who manages the system can understand collectively and centrally all of the dispersedly installed electric devices.

A program according to the present invention realizes on a computer comprising a transmitting/receiving member for transmitting/receiving information to/from other computer(s), a storage member for storing information, and a display member for displaying information: a connection information storage means for storing connection information between small Uninterrupted Power Supplies (UPS) device(s) and load device(s) powered by the small UPS device(s), which is received by the transmitting/receiving member, in the storage member with link information, which is unique at least within all of the computer(s), and storing a link list of the link information in the storage member; a connection tree generating means for generating a connection tree firstly by classifying each of the small UPS devices on the link information and the link list, and secondary by classifying each of the load devices on the connection information, and a connection tree display means for displaying the connection tree on the display member.

Installing this program in the computer, the connection information received by the transmitting/receiving member is stored in the storage member with link information, which is unique at least within all of the computer(s). The list of the link information is also stored in the storage member. Then, the connection tree is generated and displayed using the link list, the link information, and the connection information stored in the storage member. Accordingly, all of the small UPS devices and the load devices can be collectively and centrally managed with the computer.

The program according to the present invention realizes: a display image storage means, for storing a plurality of display images, each of which is associated with each of operating states of the small UPS device, in the storage member; and a display image selecting means, for selecting one of the display images in the storage member, which is corresponding to the operating state received by the transmitting/receiving member, wherein the connection tree generating means displays the selected display image in the connection tree.

Installing this program in the computer, the operating state of each of the small UPS devices is displayed in the connection tree. Therefore, it is possible to collectively and easily understand the operating states of all of the small UPS devices without connecting with each of the small UPS devices one by one sequentially. As a result, for example, it is easy to understand which part of a power supply system is in a abnormal condition, with the state of supplying internal battery power by a plurality of the small UPS devices.

The program according to the present invention realizes: an operating state information collecting means for causing a communication member to communicates with other computer, to obtain operating state information or setting information on the selected small UPS device in the connection tree, and an operating state display means for displaying the obtained information in or with the connection tree.

Installing this program in the computer, the higher controller obtains the operating state information or the setting information on each of the small UPS devices from its corresponding lower controller. And the higher controller simultaneously displays them together with the connection tree. Therefore, the administrator can understand the latest operating state or setting state of the small UPS device(s) in the higher controller at any time. As a result, for example, only by selecting the small UPS device after having executed a control or a setting to it, administrator can check the selected small UPS device works properly on the control or the setting.

The program according to the present invention realizes: a setting/control transmitting means for, when one of the small UPS device is selected in the connection tree and setting information or control information is inputted, transmitting the inputted information from the communication member to other computer, which is corresponding with the selected small UPS device.

Installing this program in the computer, the higher controller transmits the setting information or the control information to each of the lower controllers. Further, each of the lower controllers executes the setting process or the control process based on the setting information or the control information, to its corresponding small UPS device(s). Therefore, the administrator can execute setting or controlling of all of the small UPS devices centrally from the higher controller.

A UPS managing method according to the present invention comprises the steps of: storing connection information between small Uninterrupted Power Supplies (UPS) device(s) and load device(s) powered by the small UPS device(s), which is received by the transmitting/receiving member, in the storage member with link information, which is unique at least within all of the computer(s), and storing a link list of the link information in the storage member; generating a connection tree firstly by classifying each of the small UPS devices on the link information and the link list, and secondary by classifying each of the load devices on the connection information, and displaying the connection tree on the display member.

Adopting this managing method, the connection information received by the transmitting/receiving member is stored in the storage member with link information, which is unique at least within all of the computer(s). The list of the link information is also stored in the storage member. Then, the connection tree is generated and displayed using the link list, link information, and connection information stored in the storage member. Accordingly, all of the small UPS devices and the load devices can be collectively and centrally managed.

A program according to the present invention realizes on a computer comprising a transmitting/receiving member for transmitting/receiving information to/from other computer, a storage member for storing information, a display member for displaying information, and an input member for inputting information: a connection information storage means for storing information, which is received by the transmitting/receiving member or which is imputed from the inputting member, in the storage member as device information on the load device(s), which is powered by small Uninterrupted Power Supply (UPS) device(s); a transmitting destination storage means for storing destination information on the other computer in the storage member; and a connection information transmitting means for transmitting to the destination information the connection information between the small UPS device(s) and the load device(s), which consists of the stored device information and the small UPS devices.

Installing this program in the computer, the computer stores the connection information on the small UPS device, and transmits it to the transmitting destination. Therefore, the connection information on a plurality of the small UPS devices can be concentrated to the computer of the transmitting destination. The computer of the transmitting destination can collectively and centrally manage a plurality of the small UPS devices.

The program according to the present invention realizes: an operating state information transmitting means for repeatedly transmitting operating state information on its corresponding small UPS device(s) to the transmitting destination from the transmitting/receiving member.

Installing this program in the computer, the other computer as the transmitting destination repeatedly updates the operating state information on the small UPS device. Accordingly, the other computer of the transmitting destination can collectively manage the connection information on a plurality of the small UPS devices, as well as their latest operating states.

The program according to the present invention realizes: a setting/control information storage means for storing setting information or control information, which is received by the transmitting/receiving member from the other computer, in the storage member; and a setting/control information applying means for applying the stored setting information or control information to its corresponding small UPS device.

Installing this program in the computer, as receiving the setting information or the control information from other computer, the computer executes the setting process or the controlling process to its corresponding small UPS device. Therefore, other computer can monitor and control the small UPS device.

The program according to the present invention realizes: a deleting means for deleting the connection information transmitting means from the computer, the deleting means transmits deleting information to the other computer from the transmitting/receiving member, and thereafter deletes the connection information transmitting means.

Installing this program in the computer, other computer can know that the computer will not transmit new connection information anymore. Therefore, other computer can delete or invalidate the stored connection information from the computer, and not display it in the connection tree. As a result, it becomes possible to make the connection information displayed in the connection tree agree with the actual connection of the small UPS devices.

A UPS managing method according to the present invention comprises the steps of: storing information, which is received by the transmitting/receiving member or which is imputed from the inputting member, in the storage member as device information on the load device(s), which is powered by small Uninterrupted Power Supply (UPS) device(s); storing destination information on other computer in the storage member; and transmitting the connection information between the small UPS device(s) and the load device(s), which consists of the stored device information and the small UPS devices, to the destination information.

Adopting this managing method, the computer stores the connection information on the small UPS device and transmits it to the transmitting destination. Therefore, the connection information on a plurality of the small UPS devices can be concentrated to other computer of the transmitting destination. Other computer of the transmitting destination can collectively and centrally manage a plurality of the small UPS devices.

BRIEF DESCRIPTION OF THE DRAWINGS

FIG. 3 is an example of a screen for inputting information on a load

FIG. 9 is an example of combining a plurality of display images corresponding to operating states of a small UPS device;

FIG. 17 is an example of showing the detailed data structure of UPS group management information in FIG. 15;

FIG. 18 is an example showing the detailed data structure of load segment management information in FIG. 15;

FIG. 19 is an example showing the detailed data structure of UPS work group management information in FIG. 15;

FIG. 20 is an example (the first half) showing the detailed data structure of UPS domain management information in FIG. 15;

FIG. 21 is the example (the second half) showing the detailed data structure of the UPS domain management information in FIG. 15;

DETAILED DESCRIPTION OF THE PREFERRED EMBODIMENT

Hereinafter, an Uninterrupted Power Supply (UPS) managing system, an electric device managing system, managing method, and program according to the present invention will be explained, with reference to the drawings. It should be noted that explanations on configurations and the operation of the managing system for managing the UPS device also apply to the electric device managing system and program.

Embodiment

Figure 1:
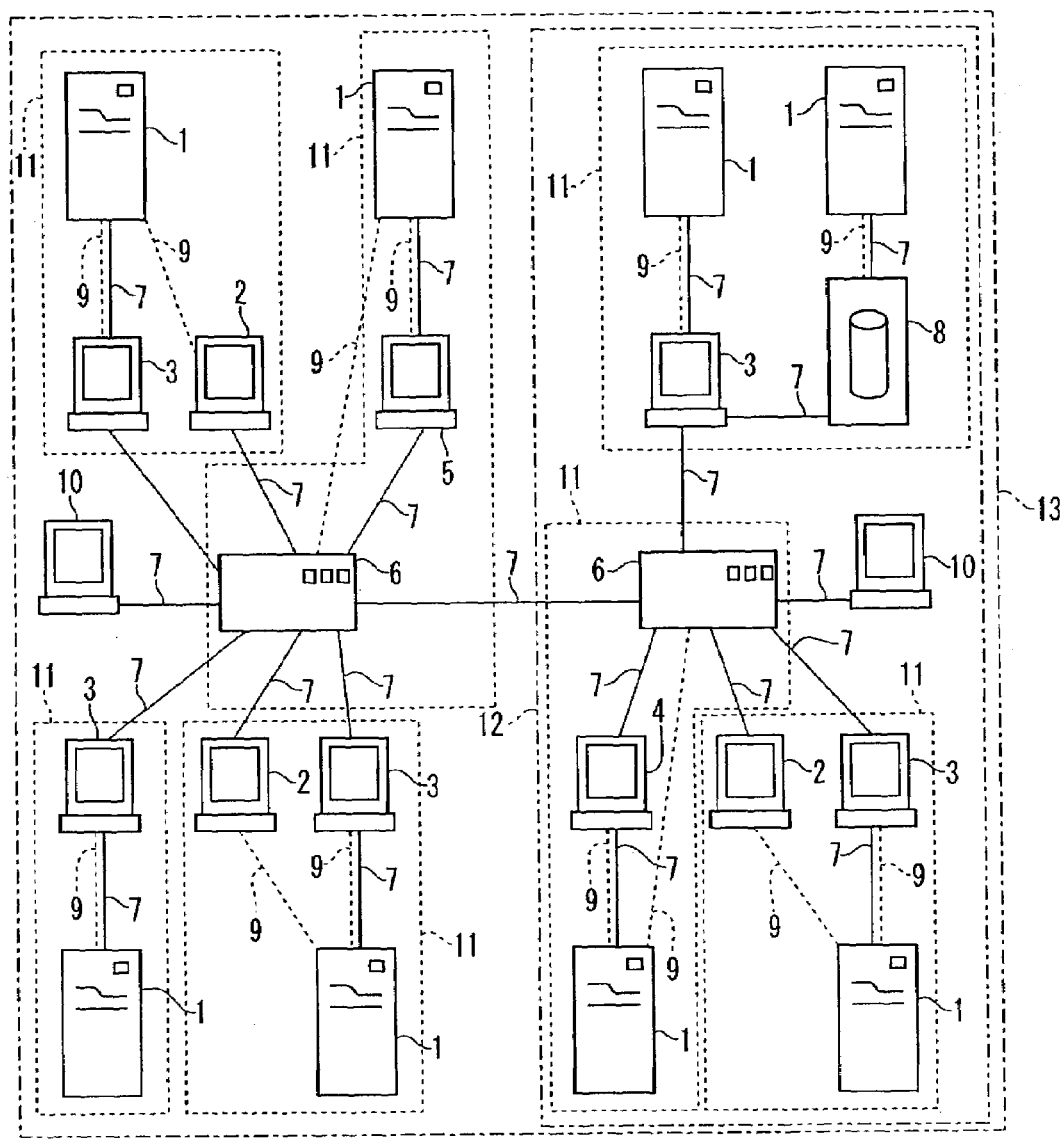
FIG. 1 is a system configuration diagram showing one example of an Uninterrupted Power Supply device (UPS) managing system according to an embodiment of the present invention.

FIG. 1 is a system configuration diagram showing one example of an UPS managing system according to an embodiment of the present invention.

The UPS managing system is a system for monitoring a plurality of small UPS devices 1. The UPS managing system has computers 2, 3, 4 and 5, to which electric power is supplied via the small UPS devices 1, a plurality of communication routers 6 as electric devices, a plurality of communication cables 7 for connecting the communication routers 6 each other; or the communication router 6 to the computers 2, 3, 4 and 5, and a disc array 8 to which power is supplied via the small UPS device 1. Each of the small UPS devices 1 and each of the computers 2, 3, 4 and 5 are connected by the communication cable 7 and can transmit/receive data and commands each other. Then, each of the computers 2, 3, 4 and 5 are corresponding to each of small UPS devices 1.

In the embodiment, a communication network is formed by a plurality of the communication routers 6 and a plurality of the communication cables 7 connected to the communication routers 6. The communication network transmits and receives information based on the TCP/IP protocol as a so-called intranet. For example, the so-called Internet, an ATM (Asynchronous Transfer Mode) exchange network, or the like may be also used as the communication network or as a part of the communication network. Information between each of the small UPS devices 1 and each of the computers 2, 3, 4 and 5 may also be transmitted or received based on the TCP/IP protocol.

Moreover, in the UPS managing system, the small UPS devices 1 and the computers 2, 3, 4 and 5 are connected by power supply cables 9. And electric power is supplied via the small UPS devices 1 and the power supply cables 9 to the computers 2, 3, 4 and 5. The small UPS devices 1 are also connected with the disc array 8 and the communication router 6 by the power supply cables 9. And electric power is supplied via the small UPS devices 1 and the power supply cables 9 to the disc array 8 and the communication router 6. It should be noted that, in the drawing, power is supplied to computers 10 not via the small UPS devices 1.

In addition, in FIG. 1, frames 11 indicated by dotted lines denote ranges of respective UPS groups which will be described later, a frame 12 indicated by a chain double-dashed line denotes a range of a UPS work group which will be described later, and a frame 13 indicated by a chain line denotes a range of a UPS domain which will be described later.

The small UPS devices 1 are connected to a power supply routes between not-shown wall sockets, provided on walls of a building, and load devices (here, the computers 2, 3, 4, 5, and the like). If power supplied from the wall socket is in normal condition, the small UPS device 1 supplies the wall socket power to the load device. While, if power supplied from the wall socket is in abnormal condition, the small UPS device 1 supplies internal power, which is charged in an internal battery, to the load device. The internal battery is charged with the normal condition wall socket power.

Figure 2:
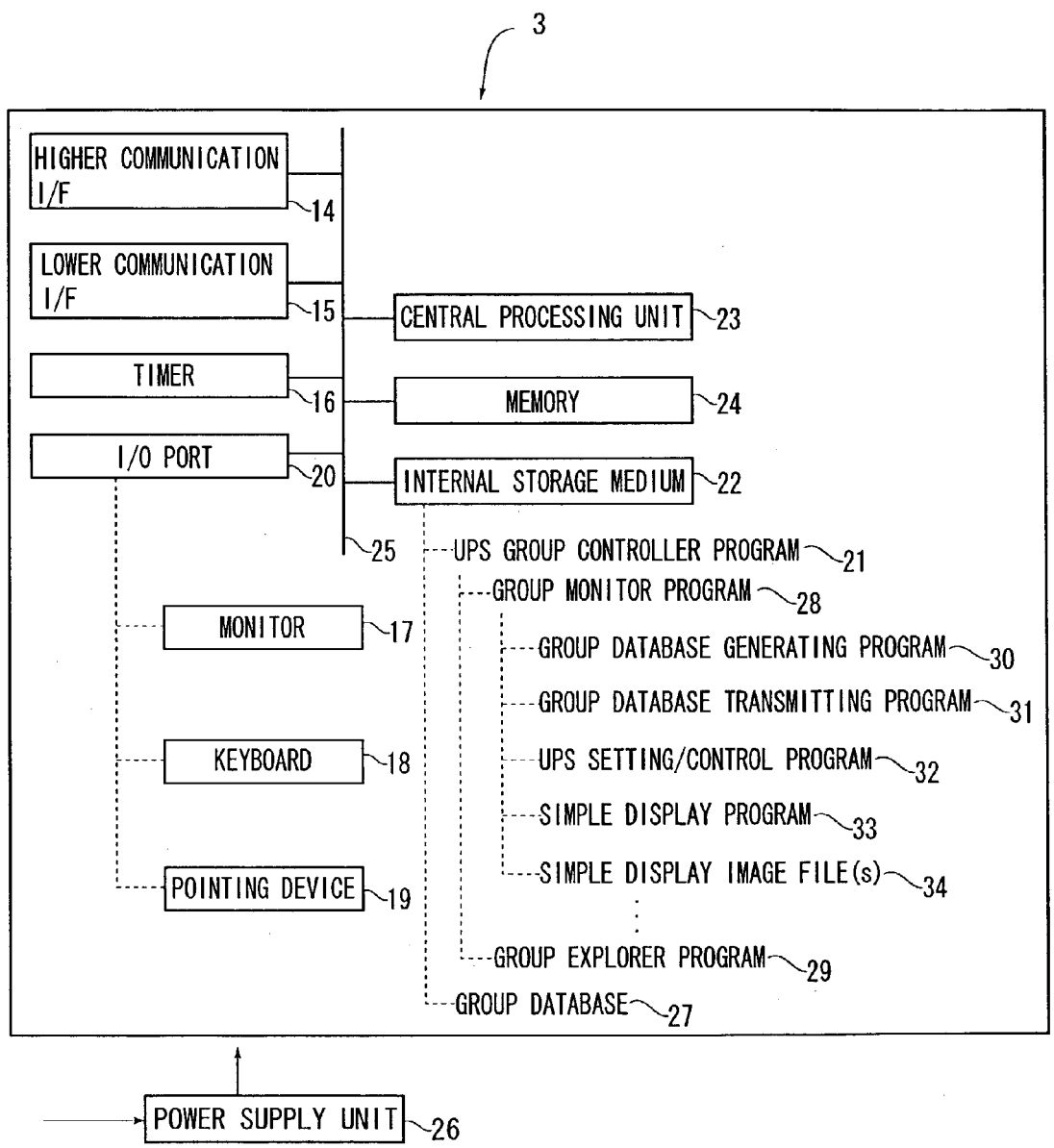
FIG. 2 is a block diagram showing an inner configuration of a UPS group controller in FIG. 1.

FIG. 2 is a block diagram showing an internal configuration of the computer (lower controller) 3, in which a UPS group controller program 21 is installed, shown in FIG. 1. Hereinafter, the computer 3 will be referred to as a UPS group controller 3.

This UPS group controller 3 is basically provided in a one-to-one correspondence to the small UPS device 1, but only one UPS group controller 3 may be provided corresponding to a plurality of the small UPS devices 1. For example, there is a case in which a plurality of the Small UPS devices collaboratively perform power backup for one load device and it is desired to manage a plurality of the Small UPS devices collectively. As in such case, one UPS group controller 3 may be provided corresponding to a plurality of the small UPS devices 1.

Figure 22:
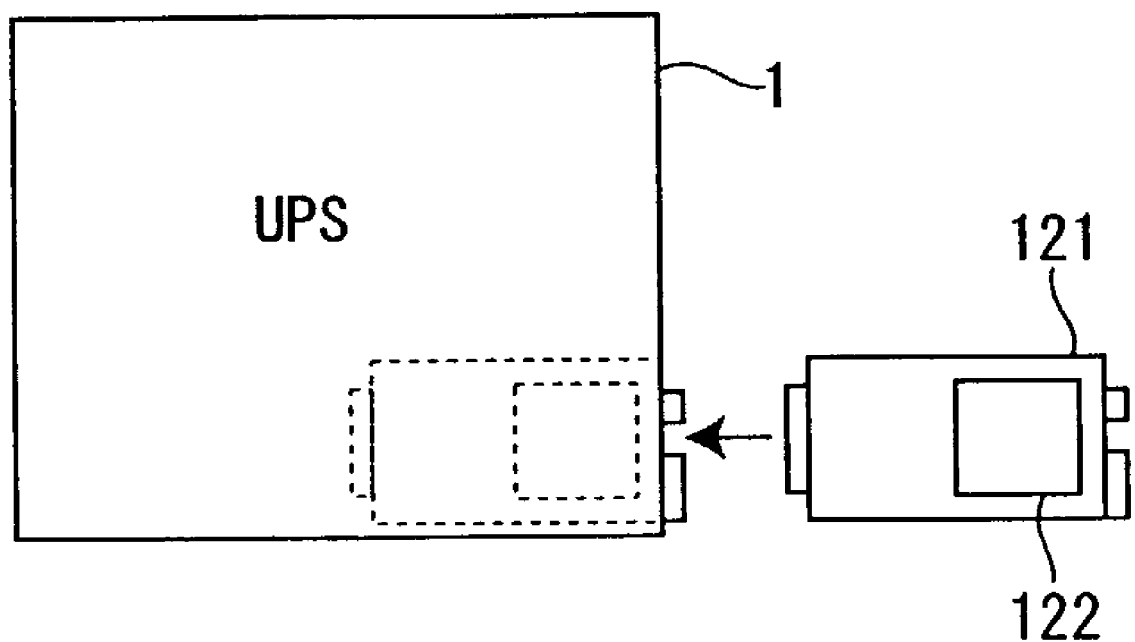
FIG. 22 is a structure diagram showing one example in which a small UPS device and a UPS group controller are integrated.

In the embodiment, the UPS group controller program 21 is installed in the computer 3, to which power is supplied from the small UPS device 1. Other computer 3, which is not powered by the small UPS device 1, may be function as a UPS group controller corresponding to the small UPS device 1. In the embodiment, the UPS group controller program 21 is installed in the general purpose computer 3 to realize the UPS group controller 3. As shown in FIG. 22, the UPS group controller 3 may be realized by inserting a network card such as a LAN board 121 into the small UPS device 1, and by storing and executing the program in a storage part 122 on the network card. As described above, the UPS group controller 3 may be joined in a housing with its corresponding small UPS device 1 or may be separately formed and connected to the small UPS device 1 by the communication cable 7. This also applies to a UPS group member controller program 41, a UPS work group controller program 55, a UPS domain controller program 81, and a UPS station controller program 129 which will be described later.

As stated above, in the case of joining the UPS group controller 3 with the small UPS device 1 in a housing, the small UPS device 1 and the UPS group controller 3 can be surely provided one to one. Therefore, it is possible to prevent some unfavorable situations, in which the UPS group controller 3 is forgotten to be installed, or in which the communication cable 7 is forgotten to be connected, more surely than in the case, in which the small UPS device 1 and the UPS group controller 3 are separately formed and connected each other by the communication cable 7. Further, by joining the UPS group controller 3 with the small UPS device 1 in a housing, even when there is no computer near the small UPS device 1, the UPS group controller 3 can be provided easily. Furthermore, by joining the UPS group controller 3 with the small UPS device 1 in a housing, the UPS group controller 3, including its hardware, is specially designed for it, and it is possible to reduce the possibility of hang-up or stoppage of the UPS group controller 3, and then connection information is more stably transmitted.

The UPS group controller 3 has an higher communication interface (I/F) 14 connected to the communication router 6 using the communication cable 7, a lower communication interface (I/F) 15 connected to the small UPS device 1 using the communication cable 7, a timer 16 for generating time, an IO port 20 to which a monitor 17, a keyboard 18, a pointing device 19, and the like are connected, an internal storage medium 22 for storing program such as the UPS group controller program 21 and data, a central processing unit (CPU) 23 for controlling peripheral devices such as the higher communication I/F 14, the lower communication I/F 15, the timer 16, the I/O port 20, and the like based on the program, a memory 24 in which the program and the like used by the CPU 23 are stored, and a system bus 25 for connecting these parts each other. Further, the power supply cable 9 is connected to a power supply unit 26 of the UPS group controller 3 and each of the above-described parts of the UPS group controller 3 operates with the power supplied via the power supply cable 9.

The UPS group controller program 21 is composed of a group monitor program 28 for generating a group database 27, which includes information on the small UPS device 1 such as, for example, connection information between the small UPS device 1 and the load device powered by this small UPS device 1 and the like, and a group explorer program 29 for displaying information on the group database 27 and detailed information on the small UPS device 1, the load device, and the like.

The group monitor program 28 is composed of a group database generating program 30 for generating the group database 27 and storing it in the internal storage medium 22, a group database transmitting program 31 for transmitting the group database 27 from the higher communication I/F 14 to other computer, a small UPS device setting/control program 32 for executing setting process and controlling process for the small UPS device 1, a simple display program 33 for imaging a part of information stored in the group database 27 and displaying it on the monitor 17, and a plurality of simple display image files 34 used by the simple display program 33.

The group database generating program 30 is executed by the CPU 23 to realize a group database generating means as a connection information storage means and an operating state information storage means in the UPS group controller 3. The group database generating means generates the group database 27 including information such as, for example, an operating state, a connecting state, and the like, on the corresponding small UPS device 1, which is connected to the lower communication I/F 15.

For example, the group database generating means cyclically executes communication between the lower communication I/F 15 and the small UPS device 1, to collect information on a model number, performance and the like of the small UPS device 1 and on actual operating state information, and stores them in the internal storage medium 22 as updated information on the small UPS device 1. The group database generating means displays an information input screen about the load device shown in FIG. 3 on the monitor 17 and, while the information input screen is being displayed, stores information inputted from the keyboard 18 or the pointing device 19 in the internal storage medium 22. In other words, the group database generating means stores identifying information such as a kind and a name of the load device, which is inputted from the keyboard 18 or the like, in the internal storage medium 22 as information on the load device powered by the small UPS device 1. Furthermore, the group database generating means stores a group member database 47, which will be described later, received by the higher communication I/F 14, in the internal storage medium 22 as information on the load device powered by the small UPS device 1.

The operating state information on the small UPS device 1 includes the value of input power (current and voltage) to the small UPS device 1, the value of load power of the small UPS device 1, an operating state (a normal operation state or a battery operation state) of the small UPS device 1, a kind of trouble of the small UPS device 1, a percentage of charge of the battery, and the like.

With above registration process of the information on the small UPS device 1 and information on the load device connected to the small UPS device 1, the group database 27 is generated in the internal storage medium 22, which includes the connection information between the small UPS device 1 and the load device powered by the small UPS device 1, and the operating state information on the small UPS device 1. The lower communication I/F 15 and the small UPS device 1 cyclically communicate to store the latest operating state information on the small UPS device 1 in the group database 27.

The group database transmitting program 31 is executed by the CPU 23 to realize a group database transmitting means as a transmitting destination storage means, a connection information transmitting means, and an operating state information transmitting means in the UPS group controller 3. This group database transmitting means collects all information in the group database 27 and cyclically transmits it from the higher communication I/F 14 to a predetermined transmitting destination in a communication.

For example, the group database transmitting means stores an IP address (communication identifying information in the communication network) of a UPS domain controller 5 or a UPS work group controller 4, which will be described later, in the internal storage medium 22 in advance. Thereafter, the group database transmitting means cyclically reads information collectively from the group database 27, and transmits the read information from the higher communication I/F 14 by designating the aforesaid IP address as a transmitting destination. Accordingly, the latest operating state information on the small UPS device 1 and the like is transmitted to the UPS domain controller 5 or the UPS work group controller 4, in synergy with the cyclic updating of the group database 27 by the group database generating means. Further, the group database transmitting means transmits its own IP address assigned to the higher communication I/F together with the information collectively read from the group database 27.

The small UPS device setting/control program 32 is executed by the CPU 23 to realize a small UPS device setting/control means as a setting/control information storage means and a setting/control information transmitting means in the UPS group controller 3. The small UPS device setting/control means transmits a control command or the like, from the lower communication I/F 15 to the small UPS device 1, to control the operation of the small UPS device 1 or to make the setting of the small UPS device 1.

For example, the small UPS device setting/control means stores setting information inputted using the keyboard 18 or the pointing device 19 to a screen for making the setting of or controlling the small UPS device 1, which is displayed on the monitor 17, or control information from other computer received by the higher communication I/F 14 in the internal storage medium 22. The small UPS device setting/control means generates the control command based on the setting information stored in the internal storage medium 22 or the control information from other computer received by the higher communication I/F 14 and transmits it from the lower communication I/F 15 to the small UPS device 1. Accordingly, for example, startup time information is transmitted to the small UPS device 1 so that the small UPS device 1 can be forcedly started up at that time. In addition, stop time information is transmitted to the small UPS device 1 so that the small UPS device 1 can be forcedly stopped at that time.

The simple display program 33 is executed by the CPU 23 to realize a simple display means as a connecting image storage means, an image data generating means, and an image data display means in the UPS group controller 3. The simple display means executes the monitor 17 to display the operating state of the small UPS device 1 using an image.

For example, the simple display means stores a plurality of the simple image files 34 in the internal storage medium 22. Then, the simple display means reads the operating state information on the small UPS device 1 from the internal storage medium 22 at a predetermined timing, and reads the simple image file 34 corresponding to the operating state from the internal storage medium 22. Further, the simple display means generate image data using the read simple image file 34 and displays the image data on the monitor 17.

In the embodiment, an image file of the wall socket, a plurality of image files corresponding to the operating states (a plurality of state image files) of the small UPS device 1, an image file of the load device, an image file of a connecting cord between the wall socket and the small UPS device 1, and an image file of a connecting cord between the small UPS device 1 and the load device are particularly stored as a plurality of the simple display image files 34. As stated above, the simple display means selects one image file 34 out of a plurality of the image files 34 corresponding to the operating states of the small UPS device 1 according to the operating state of the small UPS device 1, and arranges an image of the selected image file 34 and images of other image files 34 described above, along the power supply route to generate image data.

Figure 4:
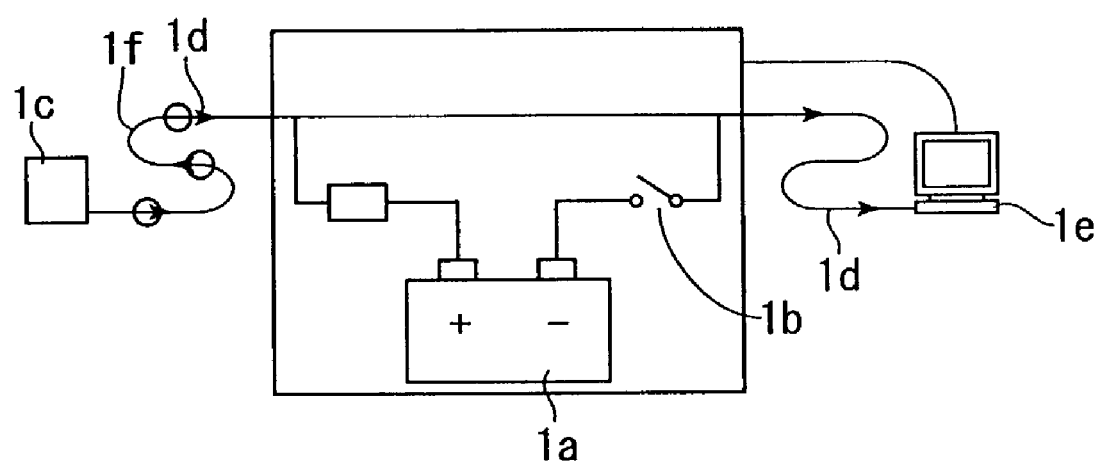
FIG. 4 is an example of image data (in feeding from a power supply) displayed on the monitor in the UPS group controller in FIG. 1.
Figure 5:
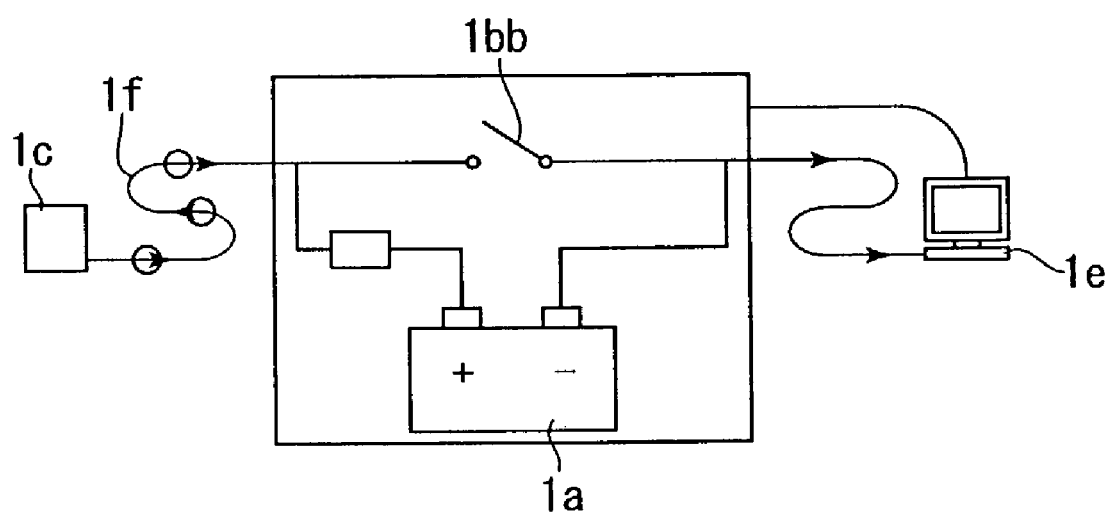
FIG. 5 is an example of image data (in feeding from a battery) displayed on the monitor in the UPS group controller in FIG. 1.

FIG. 4 shows one example of the image data generated following such steps. This image data shows the time when the small UPS device 1 supplies the wall socket power. Therefore, a switch image 1*b* connected to a storage battery 1*a* is displayed in an OFF state. When power is supplied from the battery, image data shown in FIG. 5 is displayed. In this image data, a connecting line is displayed instead of the switch image 1*b* and a new switch 1*bb* in an OFF state is displayed in a main power supply route from the wall socket. When the wall socket power is in abnormal condition, an image 1*c* of the wall socket turns to red, thus administrator can easily understand the emergency state. In addition, when power is supplied from the small UPS device 1 to the load device, arrows 1*d* are provided and moved on the connecting cord, thus administrator can easily understand the normal state.

The powering state of the small UPS device 1 is thus clearly shown by using a plurality of the images, each of which is corresponding to the each of operating states of the small UPS device 1, the socket image 1*c*, a load device image 1*e*, and a connecting cord image 1*f*, so that an administrator or his/her assistant can understand visually and intuitively the operating state of the small UPS device 1. The displayed image as shown in FIG. 4 and FIG. 5, can be used for a contact point type UPS device, which switches the power source between the wall socket and the battery.

Figure 6:
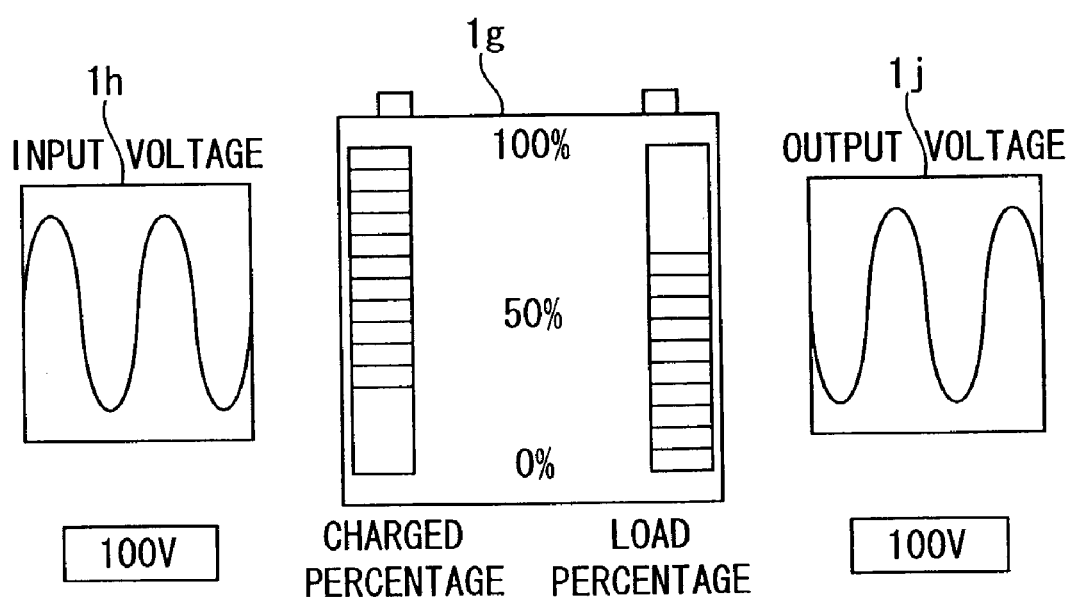
FIG. 6 is an example of image data displayed on the monitor in the UPS group controller in FIG. 1.

In addition, in this embodiment, a battery image file (a storage battery image 1*a* is contained in the file), an indicator image file (an indicator image 1*g* shown in FIG. 6 is contained in the file), and a voltage waveform image file (waveform images corresponding to an input voltage waveform image 1*h* and an output voltage waveform image 1*j* shown in FIG. 6, and the like are contained in the file) are stored, as a plurality of the simple image files 34. The simple display means arranges images of these image files 34 and overlays the operating state information on the small UPS device 1, which is read from the group database 27, on the arranged image, to generate the image data.

FIG. 6 shows one example of the image data displayed on the monitor in the normal state of the small UPS device 1. In this image data, operating state information such as the input voltage value, the output voltage value, the percentage of charge of the battery, power consumption value of the load, a rating power value, and the like can be displayed. Sine waves as the voltage waves are continuously moved so that an administrator or his/her assistant can understand the operating state visually and intuitively.

The group explorer program 29 is executed by the CPU 23 to realize a group explorer means as a display data generating means and an a display data display means in the UPS group controller 3. The group explorer means displays various kinds of information registered in the group database 27 on the monitor 17, and executes the setting process and the controlling process for the small UPS devices 1 and the load device in the UPS groups 11.

Specifically, for example, the group explorer means reads from the internal storage medium 22 the value of input power (voltage and current) to the small UPS device 1, the value of load power of the small UPS device 1, the operating state (normal operation state or battery operation state) of the small UPS device 1, the kind of trouble of the small UPS device 1, the percentage of charge of the battery, and the like, and generates display data, in which these items are listed. Then, the group explorer means displays the display data on the monitor 17. It should be noted that the display data may be displayed in a manner that the above described various kinds of information is properly classified.

As a result, the administrator or his/her assistant can understand the detailed operating state of the small UPS device 1, and execute the setting or the controlling according to the understood state for the small UPS device 1 and the like.

The simple display of the operating state of the small UPS device 1 by the simple display means, and the detailed display of the operating state of the small UPS device 1 by the group explorer means are realized, on the same UPS group controller 3 as described above. Thus, the local assistant can easily understand the operating state with the simple operating state display, and the administrator can understand the detailed operating state with the detailed operating state display.

Particularly, the simple display means is constantly operated, and the group explorer means is suitably operated as required, so that even the administrator can immediately understand an outline of the operating state of the small UPS device 1 with the images of the simple operating state display, and can immediately make the detailed operating state display be displayed whenever needed. This reduces the monitoring load and the controlling load of the administrator.

Figure 7:
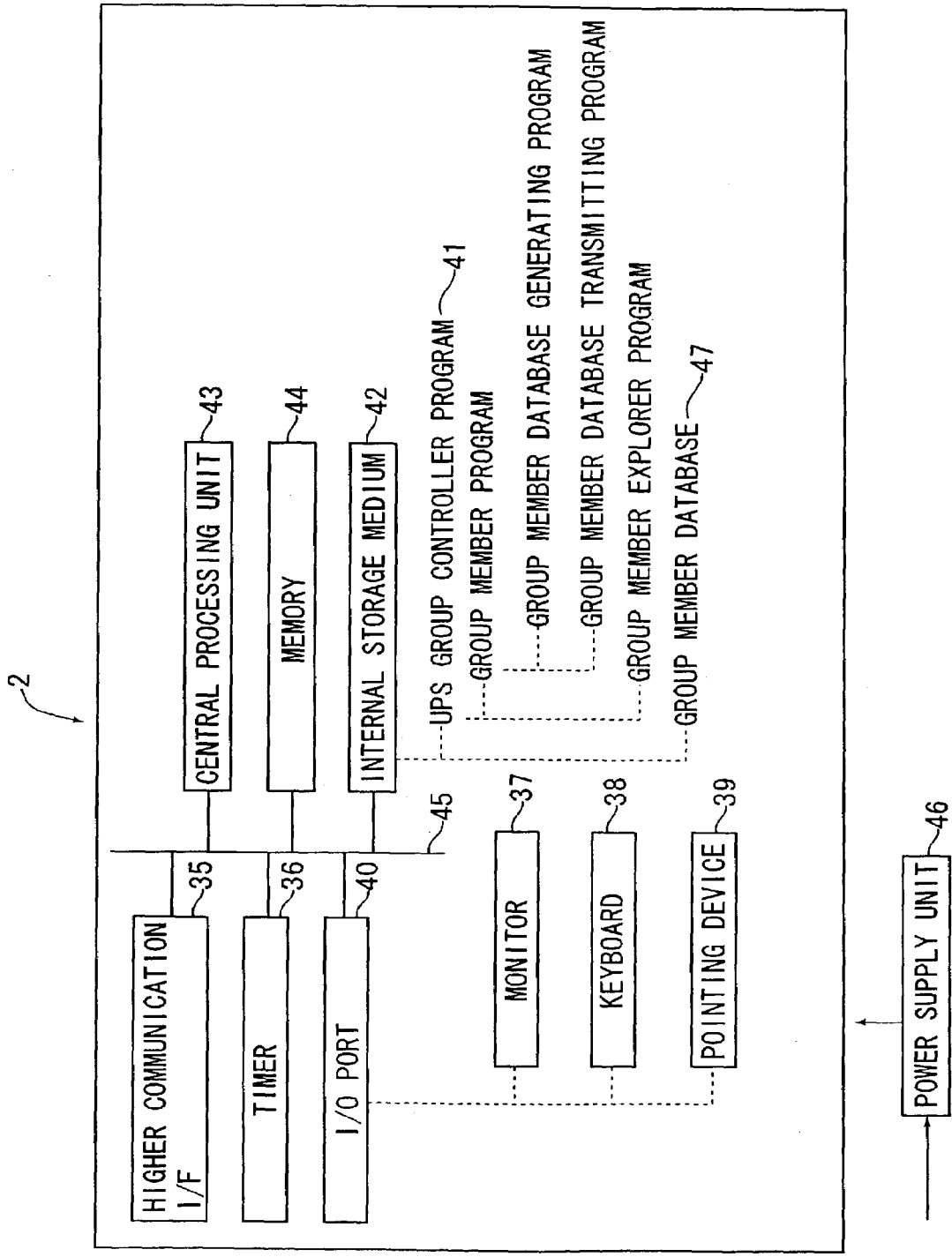
FIG. 7 is a block diagram showing an inner configuration of a UPS group member controller in FIG. 1.

FIG. 7 is a block diagram showing an internal configuration of the computer 2 as the load device, in which the UPS group member controller program 41 is installed, shown in FIG. 1. Hereinafter, this computer is referred to as a UPS group member controller 2.

The UPS group member controller 2 has an higher communication interface (I/F) 35 connected to the communication router 6 using the communication cable 7, a timer 36 for generating time, an I/O port 40 to which a monitor 37, a keyboard 38, a pointing device 39, and the like are connected, an internal storage medium 42 for storing program such as the UPS group member controller program 41 and data, a CPU 43 for controlling peripheral devices such as the higher communication I/F 35, the timer 36, the I/O port 40, and the like based on the program, a memory 44 in which the program and the like used by the CPU 43 are stored, and a system bus 45 for connecting these parts each other. Further, the power supply cable 9 is connected to a power supply unit 46 of the UPS group member controller 2 and each of the above-described parts of the UPS group member controller 2 operates with the power supplied from the small UPS device via the power supply cable 9.

The UPS group member controller program 41 is executed by the CPU 43, so that the computer 2 is operated as the UPS group member controller 2. This UPS group member controller 2 cyclically collects its own information, which is required by the UPS group controller 3 to generate the group member database 47. Further, the UPS group member controller 2 cyclically transmits data in the group member database 47 from the higher communication I/F 35 to the UPS group controller 3.

For example, the UPS group member controller 2 stores an IP address of the UPS group controller 3 in the internal storage medium 42 in advance. Thereafter, the UPS group member controller 2 cyclically transmits data in the group member database 47 from the higher communication I/F 35 by designating the aforesaid IP address as a transmitting destination in a communication.

As a result, each of the UPS group member controllers 2 shown in FIG. 1 can transmits its own latest connection information and operating state information to the UPS group controller 3 of the UPS group, to which the UPS group member controller 2 belongs. Each of the UPS group controllers 3 can store connection information on all of the load devices belonging to its UPS group 11 as connection information on the small UPS device(s) 1 in the internal information storage medium 22 of each of the UPS group controllers 3 shown in FIG. 1.

It should be noted that a detailed program of the UPS group member controller program 41 is substantially the same as that of the UPS group controller program 21 in the UPS group controller 3, and an explanation thereof will be omitted.

The small UPS device setting/control program 32, the simple display program 33, and the like, which have been explained with the UPS group controller 3, may be executed in the UPS group member controller 2. However, in this case, the small UPS device setting/control program 32 directly communicates with the UPS group controller 3, and performs the setting process or the controlling process for the small UPS device 1 via the UPS group controller 3. The simple display program 33 receives the group database 27 from the UPS group controller 3 and stores it in the internal storage medium 42 to generate the image data and the display data.

Figure 8:
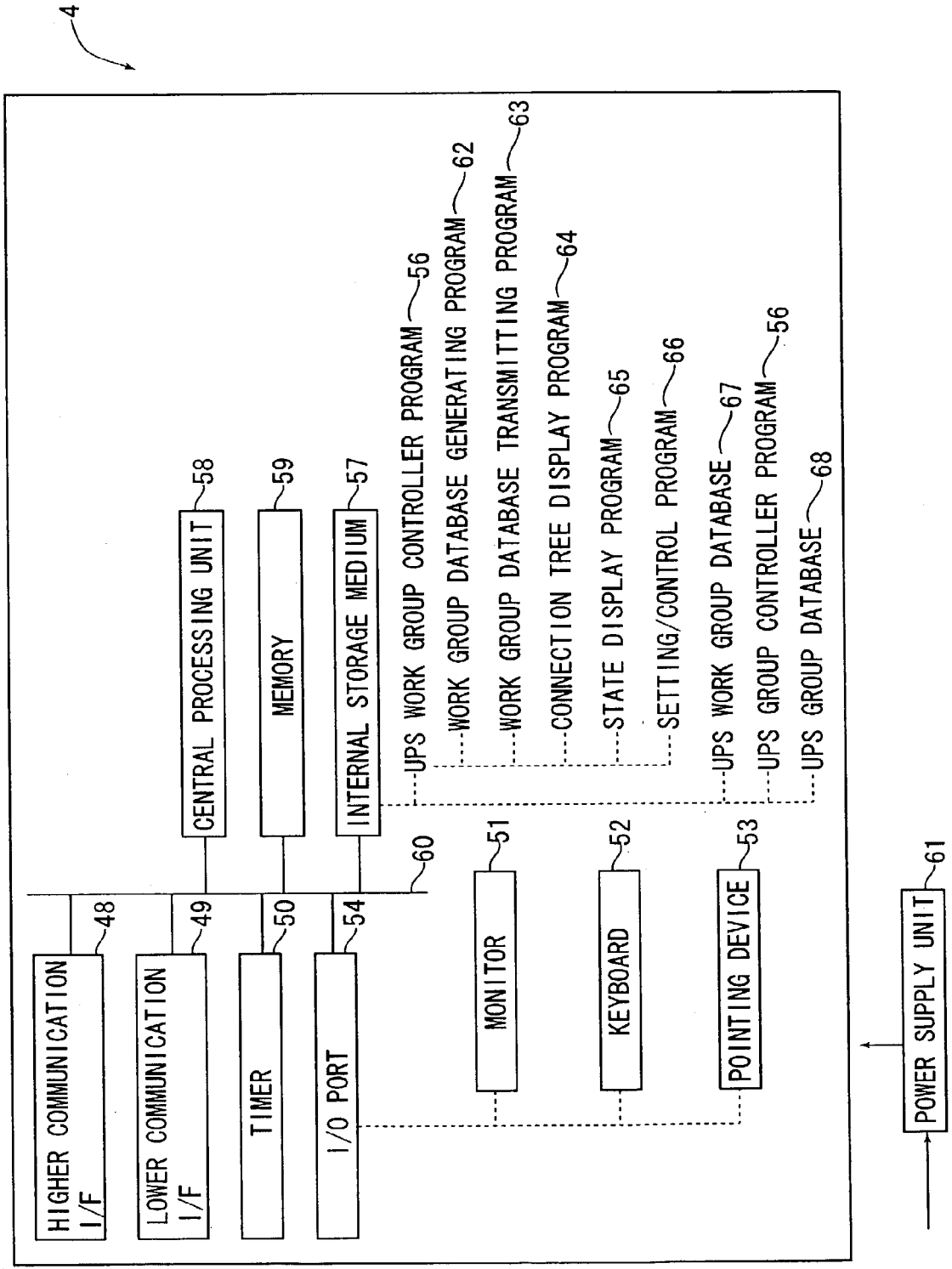
FIG. 8 is a block diagram showing an inner configuration of a UPS work group controller in FIG. 1.

FIG. 8 is a block diagram showing an internal configuration of the computer (middle controller) 4, in which the UPS work group controller program 55 is installed, shown in FIG. 1. Hereinafter, the computer 4 is referred to as the UPS work group controller 4.

The UPS work group controller 4 has an higher communication interface (I/F) 48 connected to the communication router 6 using the communication cable 7, a lower communication interface (I/F) 49 connected to the small UPS device 1 using the communication cable 7, a timer 50 for generating time, an I/O port 54 to which a monitor 51, a keyboard 52, a pointing device 53, and the like are connected, an internal storage medium 57 for storing programs such as the UPS work group controller program 55 and a UPS group controller program 56 and data, a CPU 58 for controlling peripheral devices such as the higher communication I/F 48, the lower communication I/F 49, the timer 50, the I/O port 54, and the like based on the programs, a memory 59 in which the programs and the like used by the CPU 58 are stored, and a system bus 60 for connecting these parts each other. Further, the power supply cable 9 is connected to a power supply unit 61 in the UPS work group controller 4 and each of the above-described parts of the UPS work group controller 4 operates with the power supplied via the power supply cable 9.

The work group controller program 55 has a work group database generating program 62, a work group database transmitting program 63, a connection tree display program 64, a state display program 65, and a setting/control program 66.

The work group database generating program 62 is executed by the CPU 58 to realize a work group database generating means as a connection information storage means in the UPS work group controller 4. This work group database generating means generates a work group database 67 and stores it in the internal storage medium 57.

For example, the work group database generating means adds link information, which is unique at least within the UPS group controllers 3, as transmitting sources, to the group database 27 associated with data of the IP address of the UPS group controller 3, which are transmitted from the UPS group controller 3 to the higher communication I/F 48, and stores them in the internal storage medium 57.

Further, the work group database generating means adds another specified link information, which is unique at least within the UPS group controllers 3, to data in a UPS group database 68 from the UPS group controller program 56, which is being executed in the same computer, and stores them in the internal storage medium 57.

The work group database generating means then stores a link list of the link information, which are assigned to the group database 27 and the UPS group database 58 in a one-to-one correspondence, in the internal storage medium 57. The UPS work group database 67 is composed of the information.

Therefore, in the UPS work group controller 4 shown in FIG. 1, the connection information and the operating state information on all of the load devices in the work group 12 are stored as the connection information on the UPS 1.

When the UPS work group controller program 55 and the UPS group controller program 56 run on the same computer as described above, the UPS work group database 67 and the UPS group database 68, which is the same information as a part of the UPS work group database 67, coexist on the internal information storage medium 57. In this case, overlapping information between the two databases 67,68 may be unified.

The work group database transmitting program 63 is executed by the CPU 58 to realize a work group database transmitting means in the UPS work group controller 4. The work group database transmitting means transmits data in the UPS work group database 67 from the higher communication I/F 48.

For example, the work group database transmitting means of the transmitting source stores the IP address of the UPS domain controller 5, which will be described later, in the internal storage medium 57 in advance. Thereafter, the work group database transmitting means cyclically and collectively reads information from the UPS work group database 67, and transmits the information from the higher communication I/F 48 collectively by designating the aforesaid IP address as the transmitting destination. This makes it possible to understand the latest operating state in the UPS domain controller 5 to be described later, in synergy with the cyclic updating of the UPS work group database 67 by the work group database generating means. Further, the work group database transmitting means transmits its own IP address assigned to the higher communication I/F 48 together with the information read from the UPS work group database 67.

The connection tree display program 64 is executed by the CPU 58 to realize a connection tree display means as a connection tree generating means, a connection tree display means, a state image storage means, and a state image selecting means in the UPS work group controller 4. This connection tree display means cyclically reads the connection information on the small UPS device 1 from the internal storage medium 57, and hierarchically organizes the connection information based on each of the link information, so that a connection tree 69 (see FIG. 10) is generated and displayed on the monitor 51.

Particularly, the connection tree display means previously stores a plurality of state images associated with each of the operating states, such as the normal operation state, the battery operation state, an operation stopped state, and the like, of the small UPS device 1 in the internal storage medium 57, and selects one out of a plurality of the state images using the operating state information on each of the small UPS devices 1 to assign the state image to each of the small UPS device 1 in the connection tree 69.

FIG. 9 shows an example of combining a plurality of the state images according to the operating states of the small UPS device 1 as described above. In this example of combination, as the operating states of the small UPS device 1, a normal (recovery) state, a major trouble state, a minor trouble state, a power failure stopped state, an operation stopped state, and a communication abnormal state are assumed.

Figure 10:
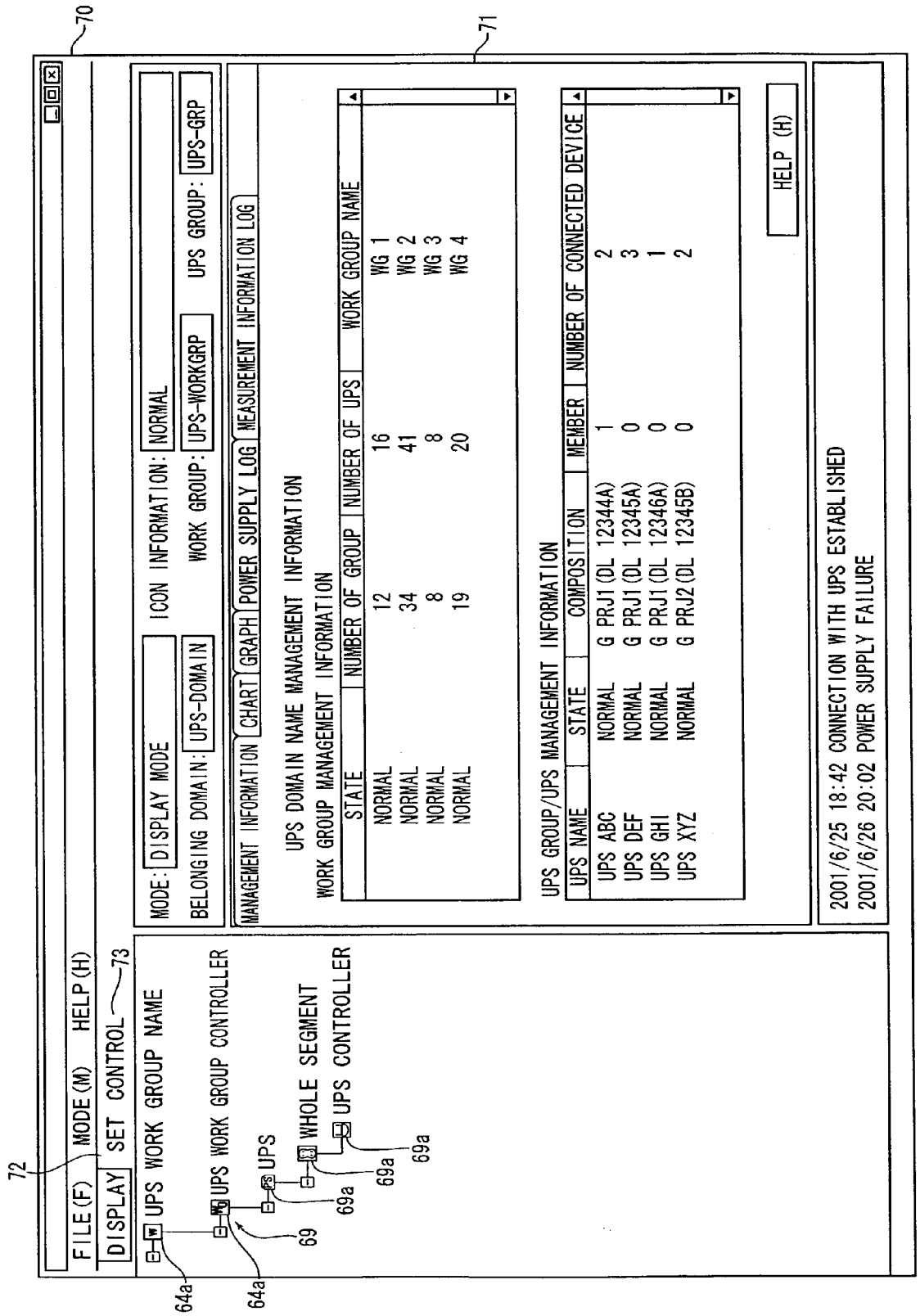
FIG. 10 is an example of displaying a connection tree and a display area displayed on a monitor in the UPS work group controller in FIG. 1 (a first example)

FIG. 10 shows an example of displaying the connection tree 69. A window shown in FIG. 10 is assigned two frames of the left and the light. In a first frame on the left side, the connection tree is displayed. In the connection tree 69, not only the small UPS device 1 but also the load device, a load segment, the UPS group 11, the UPS work group controller 4, and the UPS work group 12 are also associated with similar state images 69a. In a second frame on the right side, as will be described later, a screen for displaying operating state information on an item selected from the connection tree, a screen for inputting setting information and a screen for inputting control information are displayed by turns.

The state display program 65 is executed by the CPU 58 to realize a state display means as an operating state information collecting means and an operating state display means in the UPS work group controller 4. This state display means obtains present operating state information on the small UPS device 1 or the load device selected from the connection tree 69 and displays it on the monitor 51.

For example, when the UPS 1 or the load device is selected in the connection tree 69, the state display means transmits a transmission command of the operating state information from the higher communication I/F 48 to the UPS group controller 3 or the UPS group member controller 2 based on the selecting operation, and the higher communication I/F 48 receives the operating state information transmitted based on the transmission command to display a screen which displays the received operating state information in a second frame 71 of the monitor 51. The operating state information in the second frame includes, for example, latest information on the small UPS device 1, a log of the information, a log of power supply, and the like.

Particularly, in the embodiment, the second frame 71 for displaying the operating state information is displayed together with the aforesaid connection tree 69 in the window 70 (see FIG. 10), so that the connection tree 69 and the operating state information can be simultaneously displayed.

Therefore, the administrator or his/her assistant easily understands whether or not the small UPS devices 1 in the abnormal condition, based on the state images in the connection tree 69, and by selecting a small UPS device 1 or the like from the first frame, on the same screen, the administrator or his/her assistant can easily understands the present operating state of the small UPS device 1 in the second frame 71. As a result, when an abnormal condition is occurred, the administrator or his/her assistant can quickly identify the problem and the course of the problem, and immediately take a proper countermeasure, as monitoring the whole of the small UPS devices 1 in the connection tree. In FIG. 10, the operating state of the UPS 1 in the work group 12 is displayed.

The setting/control program 66 is executed by the CPU 58 to realize a setting/control means as a setting/control transmitting means in the UPS work group controller 4. This setting/control means transmits setting information or control information from the higher communication I/F 48, to a predetermined UPS group controller 3 or UPS group member controller 2.

For example, when a setting button 72 in the window 70 of the work group controller program 55 is selected, the setting/control means displays a screen for inputting setting information for the small UPS device 1, which is selected from the connection tree 69 in the first frame, in the second frame 71 by turns. Then, in this display state, the setting/control means generates setting information based on input information inputted from the keyboard 52 or the pointing device 53. Next, the setting/control means transmits the setting information by designating the UPS group controller 3 connected to the selected small UPS device 1 as a transmitting destination from the higher communication I/F 48. It should be noted that an IP address of the computer to be the transmitting destination could be obtained from the UPS work group database 67. The setting information includes, for example, an operation schedule of the small UPS device 1, a shutdown timing of the load device of the small UPS device 1, and the like.

In addition, for example, a control button 73 in the window 70 of the work group controller program 55 is selected, the setting/control means displays a screen for inputting control information for the small UPS device 1, which is selected from the connection tree 69 in the first frame, in the second frame 71 by switching. Then, in this display state, the setting/control means generates control information based on input information inputted from the keyboard 52 or the pointing device 53. Next, the setting/control means transmits the control information by designating the UPS group controller 3 connected to the aforesaid small UPS device 1 as the transmitting destination from the higher communication I/F 48. The control information includes, for example, forced-stoppage and restart of the small UPS device 1, forced-stoppage and restart of the load device, a self-test of the small UPS device 1, and the like.

It should be noted that, when the display button in the window 70 of the work group controller program 55 is selected, the screen for displaying the operating state information on the small UPS device 1, which is selected from the connection tree 69 in the first frame, is displayed in the second frame 71 by turns.

As a result, the setting and the control for all of the small UPS devices 1 in the work group 12 can be executed in the UPS work group controller 4.

Figure 11:
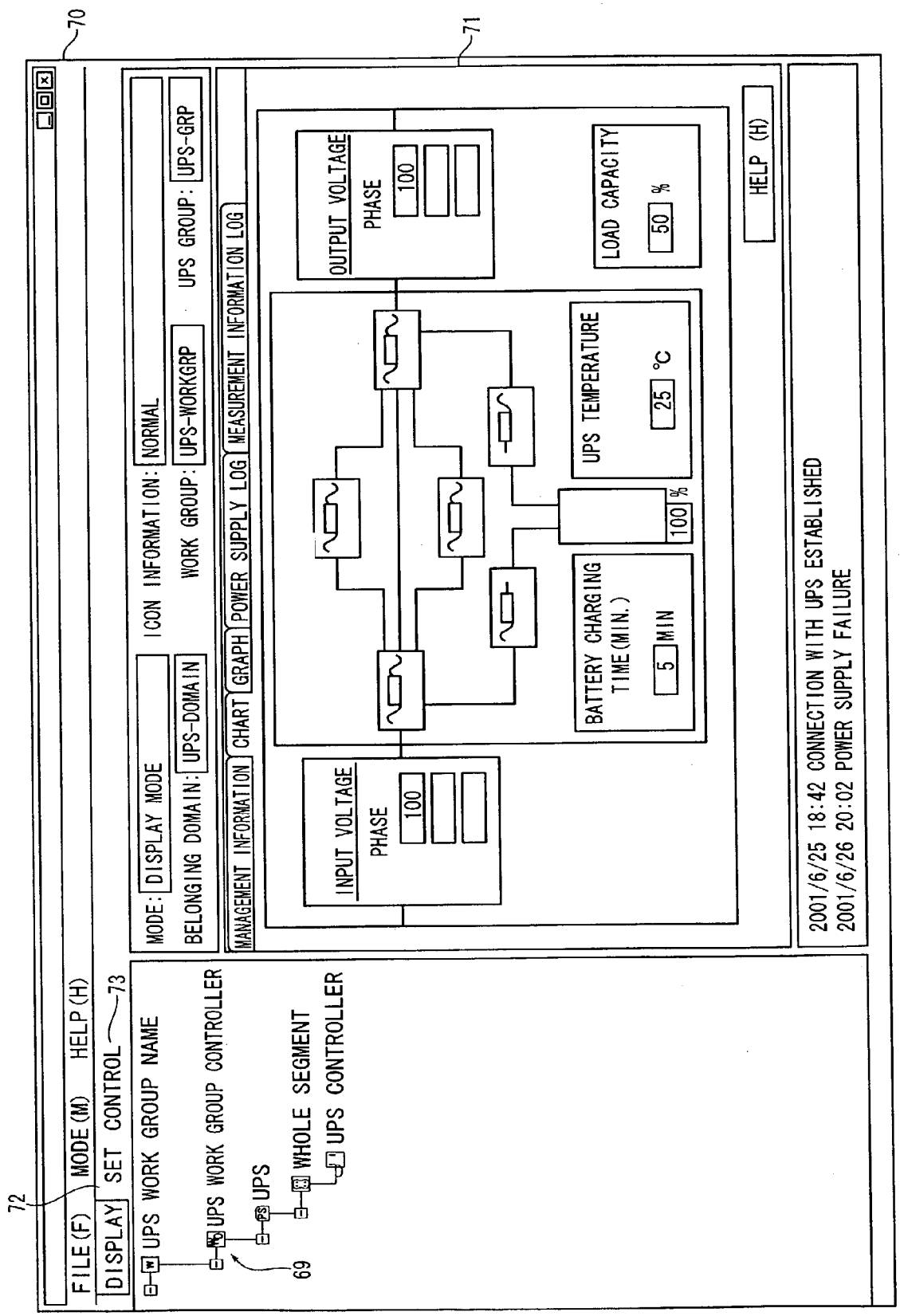
FIG. 11 is an example of displaying the connection tree and the display area displayed on the monitor in the UPS work group controller in FIG. 1 (a second example)
Figure 12:
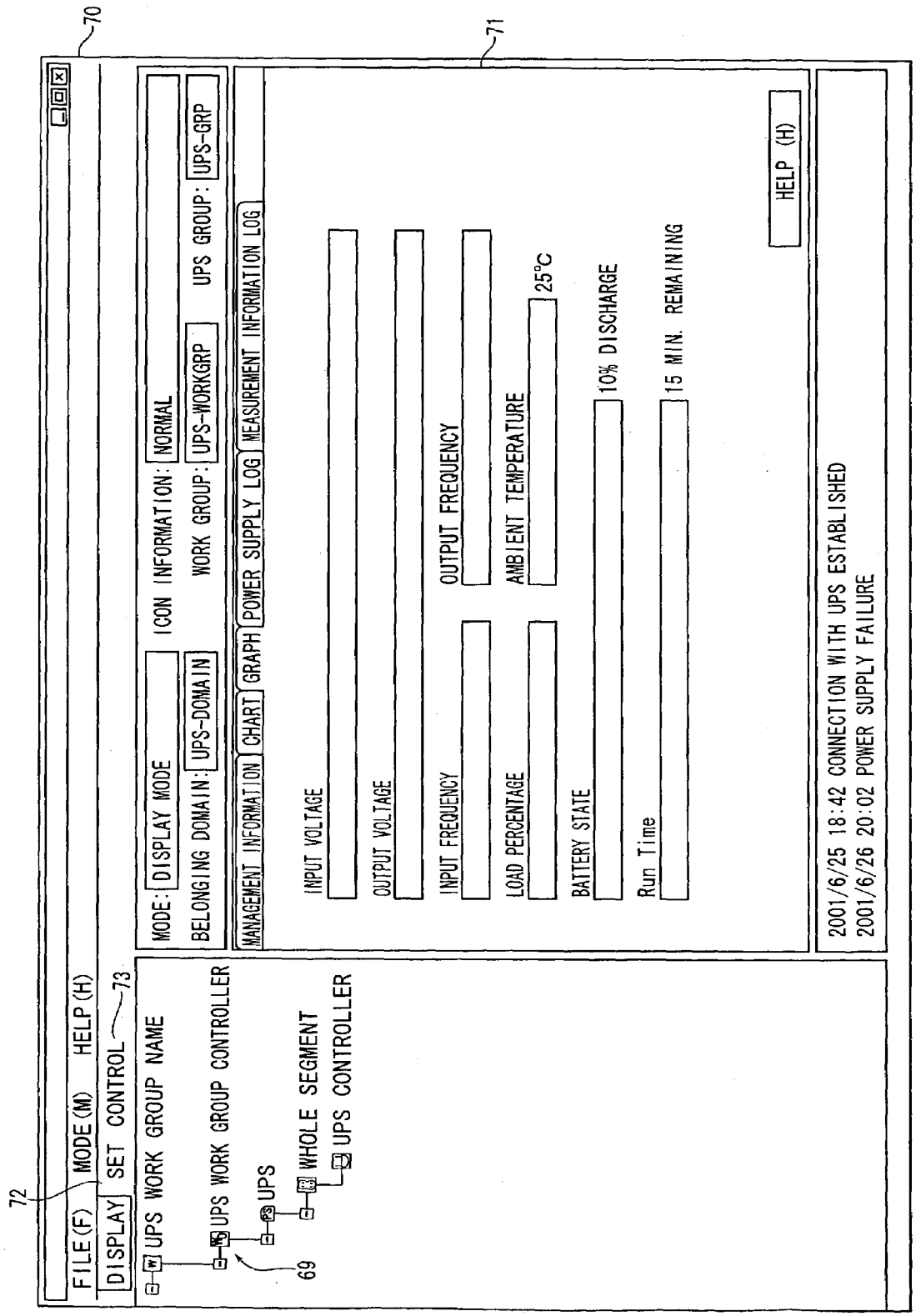
FIG. 12 is an example of displaying the connection tree and the display area displayed on the monitor in the UPS work group controller in FIG. 1 (a third example)

FIG. 11 and FIG. 12 show other examples of display. In the example in FIG. 11, the operating state of the small UPS device 1 is displayed in a chart format in the second frame 71. In the example in FIG. 12, the operating state of the small UPS device 1 is displayed in a graphical format in the second frame 71. The operating state information on devices such as the small UPS device 1 is thus classified and displayed using tags, so that the administrator or his/her assistant can understand important information systematically, while understand a lot of displayed operating state information.

Other configurations than the above description are the same as the configurations assigned the same names in the UPS group controller 3, and the explanations thereof will be omitted.

Figure 13:
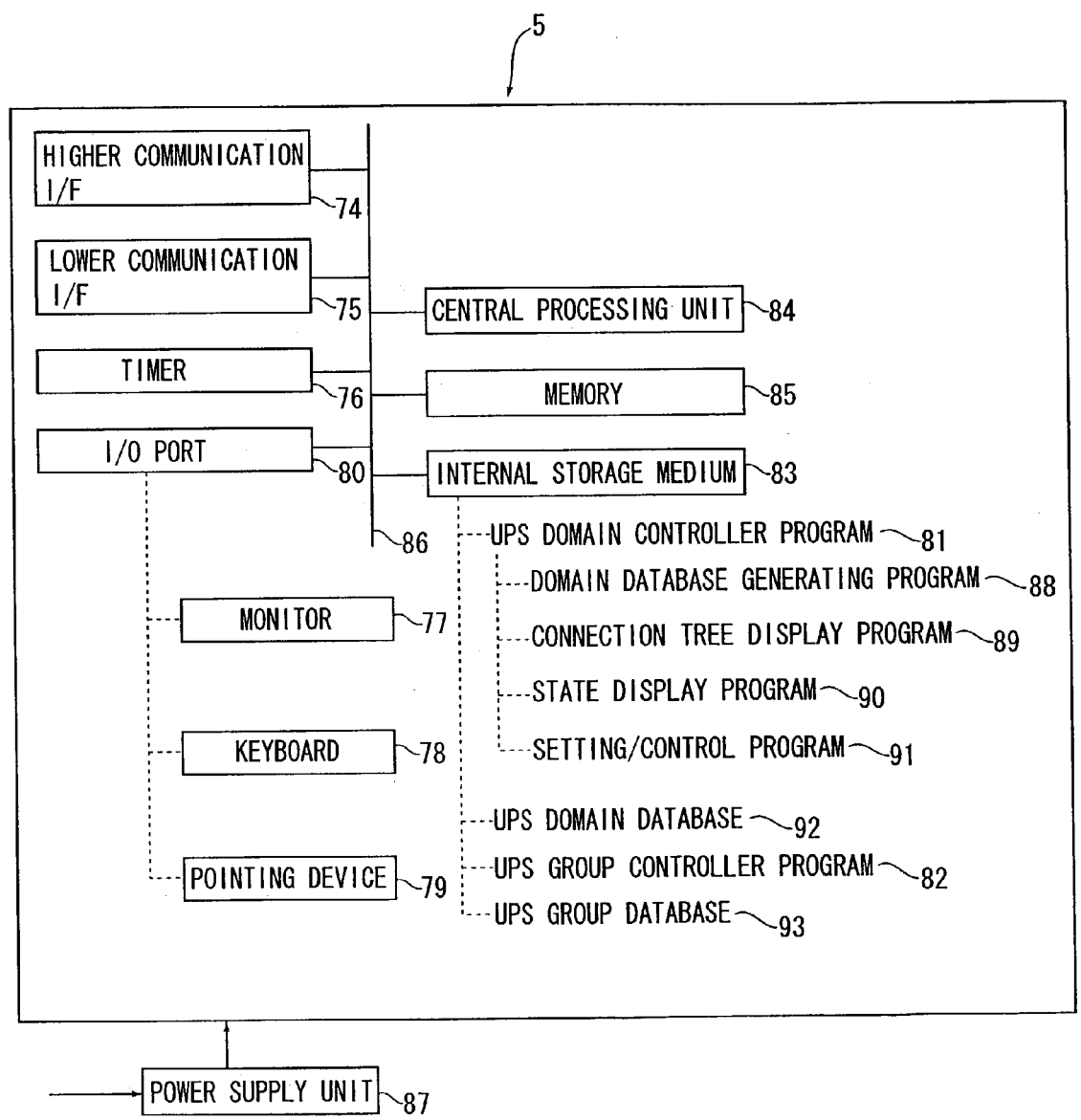
FIG. 13 is a block diagram showing an inner configuration of a UPS domain controller in FIG. 1.

FIG. 13 is a block diagram showing an internal configuration of the computer (higher controller) 5 in which the UPS domain controller program 81 is installed, shown in FIG. 1. Hereinafter, the computer 5 is referred to as the UPS domain controller 5.

The UPS domain controller 5 has an higher communication interface (I/F) 74 connected to the communication router 6 using the communication cable 7, a lower communication interface (I/F) 75 connected to the small UPS device 1 using the communication cable 7, a timer 76 for generating time, an I/O port 80 to which a monitor 77, a keyboard 78, a pointing device 79, and the like are connected, an internal storage medium 83 for storing programs such as the UPS domain controller program 81 and a UPS group controller program 82 and data, a CPU 84 for controlling peripheral devices such as the higher communication I/F 74, the timer 76, the I/O port 80, and the like based on the programs, a memory 85 in which the programs and the like used by the CPU 84 are stored, and a system bus 86 for connecting these parts each other. Further, the power supply cable 9 is connected to a power supply unit 87 in the UPS domain controller 5 and each of the above-described parts operates with the power supplied via the power supply cable 9.

The UPS domain controller program 81 has a domain database generating program 88, a connection tree display program 89, a state display program 90, and a setting/control program 91.

The domain database generating program 88 is executed by the CPU 84 to realize a domain database generating means as a connection information storage means in the UPS domain controller 5. This domain database generating means generates a UPS domain database 92 and stores it in the internal storage medium 83.

For example, the domain database generating means adds link information, which is unique at least within specified to each of transmission sources, to data in the group database 27 transmitted from the UPS group controller 3 to the higher communication I/F 74, or to data in the UPS work group database 67 transmitted from the UPS work group controller 4 to the higher communication I/F 74. Then, the domain database generating means stores them in the internal storage medium 83.

Further, the domain database generating means adds another specified link information, which is unique at least within specified to each of transmission sources, to data in a UPS group database 93 from the UPS group controller program 82, which is being executed in the same computer, and stores them in the internal storage medium 83.

The domain database generating means further stores a list of this link information in the internal storage medium 83.

Therefore, in the UPS domain controller 5 shown in FIG. 1, the connection information and the operating state information on all of the small UPS devices 1 in the UPS domain 13 are stored as the connection information on the Small UPS devices 1.

Incidentally, when the UPS domain controller program 81 and the UPS group controller program 82 run on the same computer as described above, the UPS domain database 92 and the UPS group database 93, which is the same information as a part of the UPS domain database 92, coexist on the internal information storage medium 83. In this case, overlapping information between the two databases 92,93 may be unified.

Figure 14:
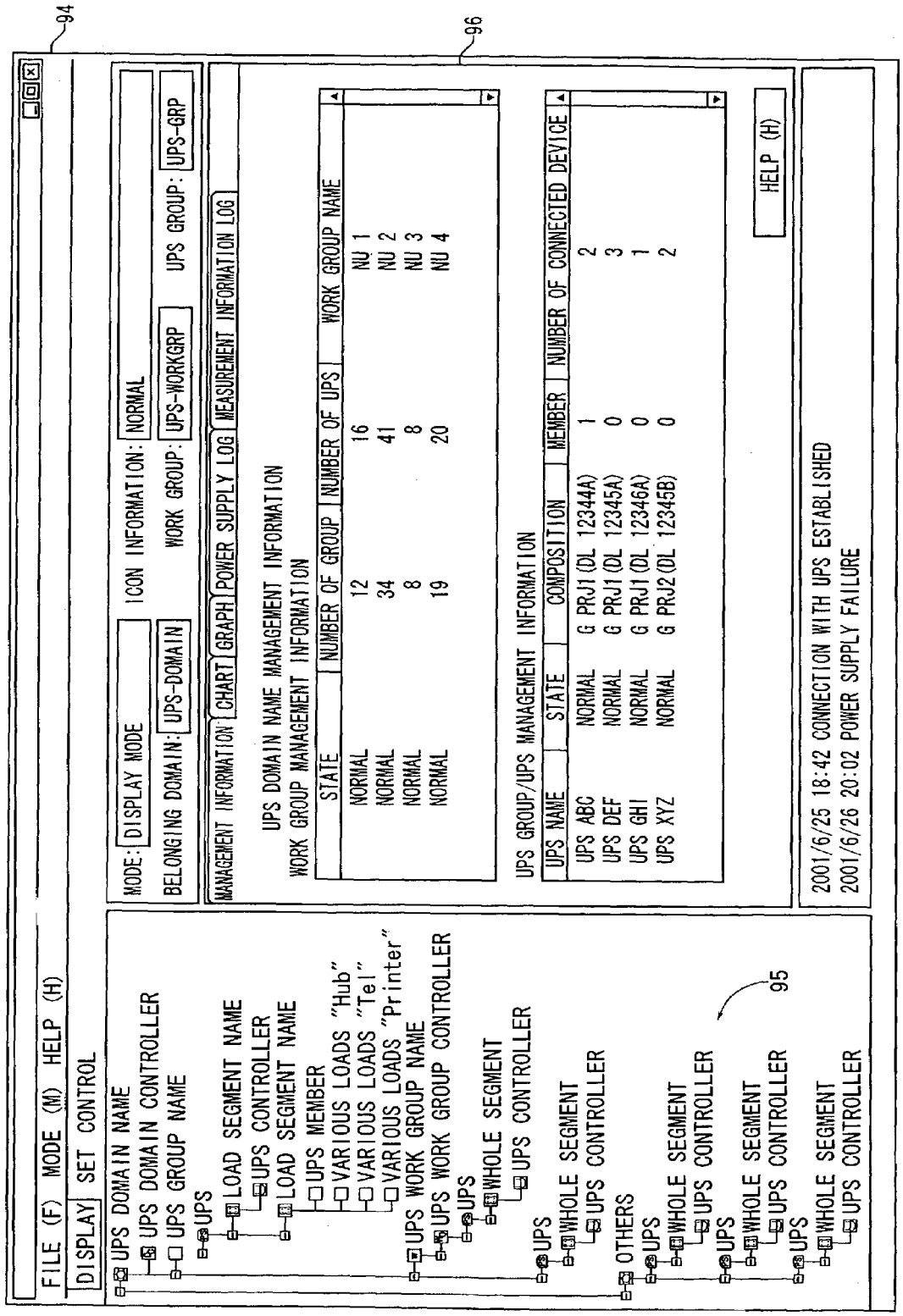
FIG. 14 is an example of displaying a connection tree and a display area displayed on a monitor in the UPS domain controller in FIG. 1.

Other programs than that described above are the same as the programs assigned the same names in the UPS work group controller program 55, and the explanations thereof will be omitted. FIG. 14 is an example in which a connection tree 95 in the UPS domain 13 and a second frame 96 are presented in a window 94 displayed by the operation of the domain controller program 81. In FIG. 14, the operating states of the small UPS devices 1 in a selected work group 12 are displayed in a list in the second frame 96.

Figure 15:
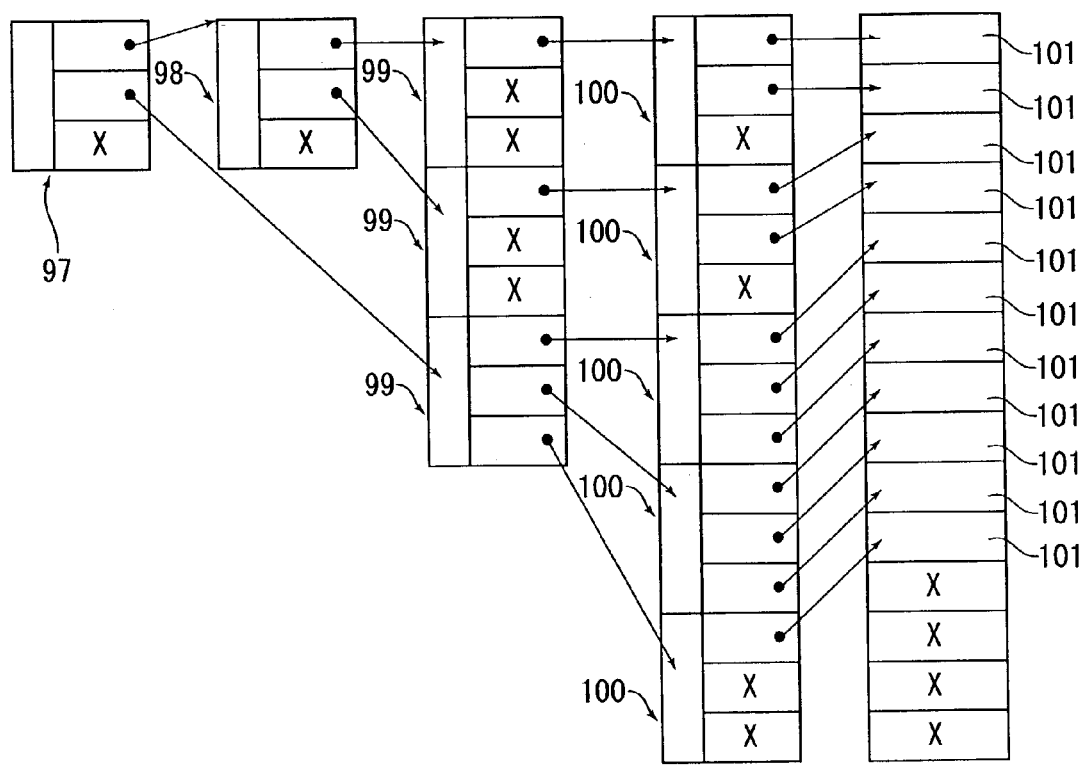
FIG. 15 is an example showing the detailed data structure of a domain database used in the UPS domain controller in FIG. 1.

FIG. 15 shows one example of the detailed data structure of the UPS domain database 92. In the drawing, the numeral 97 denotes UPS domain management information, 98 denotes UPS work group management information, 99 denote UPS group management information respectively, 100 denote load segment management information, and 101 denote load device management information. It should be noted that each of these management information 97 to 101 is stored in the internal storage medium 83 as a file, for example.

Figure 16:
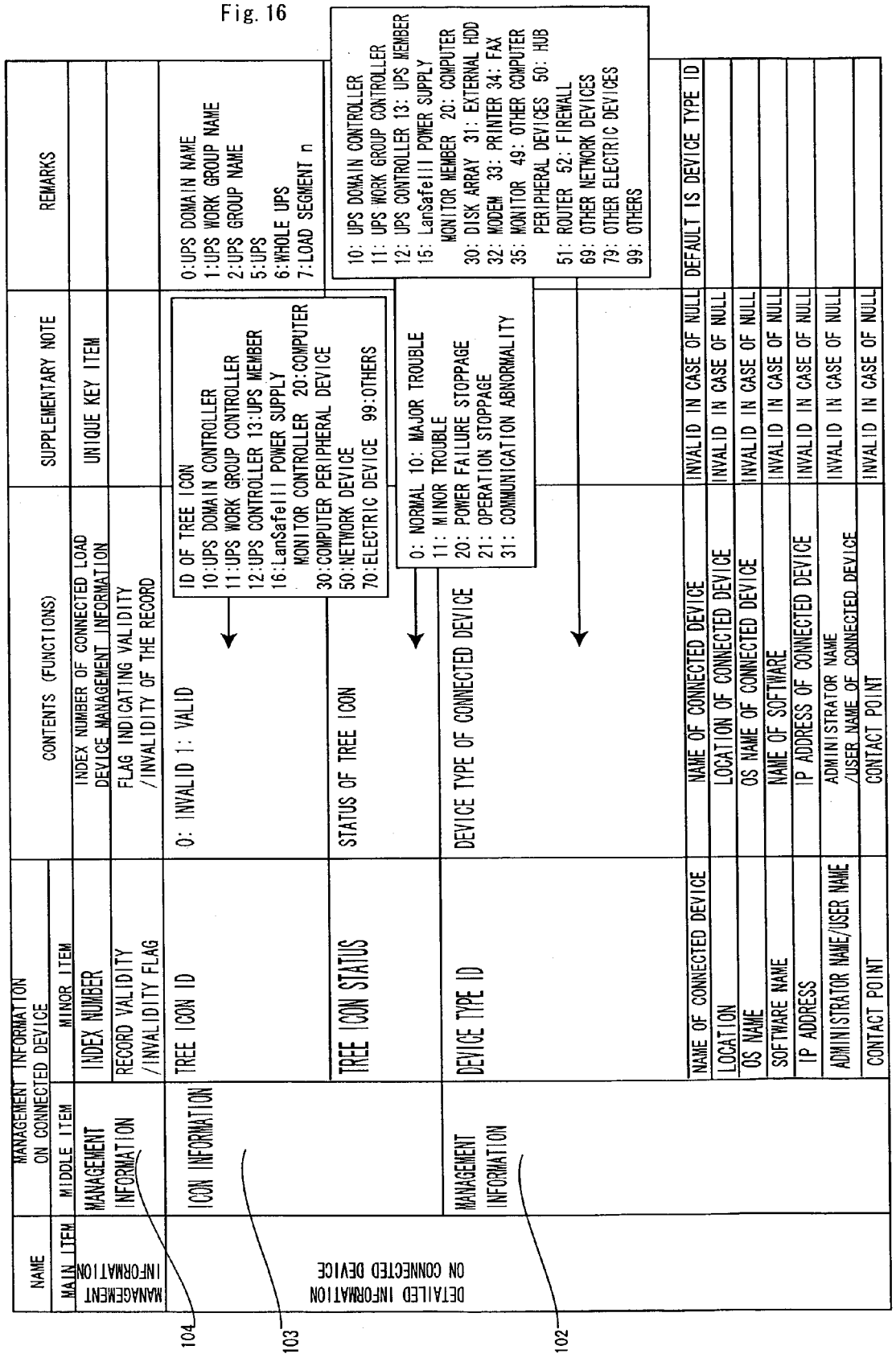
FIG. 16 is an example showing the detailed data structure of connected device management information in FIG. 15.

The load device management information 101 is the information provided for each of the load devices such as the computer powered by the small UPS device 1 and the communication router 6. And the load device management information 101 is composed of, as shown in FIG. 16, information 102 of the load device itself, icon information 103 used in displaying the load devices in the connection tree 95, and management information 104 for managing the load devices in the UPS domain 13.

An INDEX number registered as one of the management information is the number specifically assigned to at least each of tree elements such as, the load device management information 101, the load segment management information 100, the UPS group management information 99, and the UPS work group management information 98. Thus, when the UPS domain 13 is displayed in the connection tree 95, all the displayed tree elements are distinguished each other.

The UPS group management information 99 is the information provided for each of the small UPS devices 1. And The UPS group management information 99 is composed of, as shown in FIG. 17, connecting UPS information 105 of the small UPS device 1 itself, icon information 106 used in displaying the small UPS devices 1 in the connection tree 95, management information 107 (including its own INDEX number) for managing the UPS group management information 99 in the UPS domain 13, controller information 108 of the UPS group controller 3 connected to the small UPS device 1, and load segment management information 109 (including an INDEX number of the load segment management information) provided for each of the load segments.

At least one load segment is defined for one UPS group 11. For example, when the UPS group 11 includes a plurality of output sockets and the small UPS devices 1 capable of independently setting and controlling these sockets, the same number of the load segments as that of the output sockets are set. As a result, it becomes possible to perform the setting or the control considering each of the output sockets as a unit.

The load segment management information 100 described above is the information provided for each of the load segments. The load segment management information 100 is composed of, as shown in FIG. 18, icon information 110 used in displaying the load devices in the connection tree 95, management information 111 (including its own INDEX number) for managing the load segment management information 100 in the UPS domain 13, and information 112 of the load devices (including an INDEX number of the load device) in the load segment.

The UPS work group management information 98 described above is the information provided for each of the UPS work groups 12. The UPS work group management information 98 is composed of, as shown in FIG. 19, work group controller information 113 of the UPS work group controller 4 itself, icon information 114 used in displaying the UPS work group controller 4 in the connection tree 95, management information 115 (including its own INDEX number) for managing the UPS work group management information 98 in the UPS domain 13, and UPS group management information 116 (including an INDEX number of the UPS group management information) in the UPS work group 12.

The UPS domain management information 97 is the information provided for each of the UPS domains 13. The UPS domain management information 97 is composed of, as shown in FIG. 20 and FIG. 21, UPS domain controller information 117 of the UPS domain controller 5 itself, icon information 118 used in displaying the UPS domain controller 5 in the connection tree 95, and connection information 119 constituted by the UPS work group management information 98 (including an INDEX number of the UPS work group management information 98) immediately under the UPS domain 13, the UPS group management information 99 (including an INDEX number of the UPS group management information 99) immediately under the UPS domain 13, and the like.

With such data structure, the UPS domain management information 97 can be listed, and the management information is referred in sequence from the UPS work group management information 98 to the UPS group management information 99, the load segment management information 100, the load device information 101 by referring to the INDEX numbers, so that the connecting state of each of the devices can be understood. Therefore, the connection tree 95 including all of the load devices and the small UPS devices 1 in the UPS domain 13 can be generated with the UPS domain management information 97 and the INDEX numbers.

In the UPS group member controller 2, other information than the management information 104 in its own load device management information 101 is generated as the group member database 47. Then, the group member database 47 is transmitted from the UPS group member controller 2 to the UPS group controller 3.

In the UPS group controller 3, the group database 27 is generated which is composed of other information than the management information 107 in the UPS group management information 99, the load segment management information 100, and the load device management information 101. The load device management information 101 is generated, by adding the management information 104 to data in the group member database 47, which was received from the UPS group member controller 2. Then, this group database 27 is transmitted from the UPS group controller 3 to the UPS work group controller 4.

In the UPS work group controller 4, the UPS work group database 67 is generated, which is composed of other information than the management information 115 in the UPS work group management information 98, the UPS group management information 99, the load segment management information 100, and the load device management information 101. The UPS group management information 99 is generated, by adding the management information 107 to the group database 27,which was received from the UPS group controller 3. Then, data in this UPS work group database 67 is transmitted from the UPS work group controller 4 to the UPS domain controller 5.

Finally, in the UPS domain controller 5, the UPS domain database 92 is generated, which is composed of the UPS domain management information 97, the UPS work group management information 98, the UPS group management information 99, the load segment management information 100, and the load device management information 101. The UPS work group management information 98 is generated, by adding the management information 115 to the UPS work group database 67,which was received from the UPS work group controller 4. The UPS group management information 99 is generated, by adding the management information 107 to the group database 27, which was received from the UPS group controller 3. The domain management information 97, which is a list of the added management information, is generated.

As stated above, the connection information is transmitted from the UPS group member controller 2 to the UPS group controller 3, from the UPS group controller 3 to the UPS work group controller 4, and further, from the UPS work group controller 4 to the UPS domain controller 5, as well as the INDEX numbers (management information) are added in the controllers of a receiving side, in order to distinguish the received information each other, so that the information can be distinguished in the UPS domain controller 5 and the UPS work group controller 4 only by transmitting the received information to the higher controller as it is.

Moreover, as for transmission between the controllers, the information (IP address) of the transmitting destination is registered in the controller of the transmitting source and the transmission is performed based on the transmitting destination information, so that the structure of the connection tree 95 can be changed only by rewriting the transmitting destination information. As a result, only by rewriting the transmitting destination information, the UPS group 11, the UPS work group 12, and the UPS domain 13 including the small UPS device 1 and the like can be changed.

In addition, data is divided into files considering the UPS domain management information 97, the UPS work group management information 98, the UPS group management information 99, the load segment management information 100, and the load device management information 101 as units, so that the whole data amount can be reduced compared with, for example, a file in which the whole UPS domain 13 is presented in a table.

In the UPS work group controller 4, the connection information received from each of the UPS group controllers 3 is stored in the UPS work group database 67 according to the following rules.

1. When the first connection information is received from each of the UPS group controllers 3, the work group database generating means reserves a continuous memory areas which has the size capable of storing more amount of information than that of the information on the first connection information in the UPS work group database 67, and collectively stores all of the first connection information in the first communication in the reserved continuous memory areas.

2. The work group database generating means stores the second and subsequent connection information received from each of the UPS group controllers 3 in the reserved memory areas, which have been already reserved for the respective connection information for rewriting.

The connection information is thus stored in the UPS work group database 67, so that the work group database generating means can store a plurality of the connection information in the UPS work group database 67 even if a plurality of the connection information are received continuously. Further, even if the information amount of the connection information is increased because of addition of a load device of the small UPS device, the connection information with the increased information amount can be collectively stored in the memory areas, which have been used so far. As a result, both of improvement in ability of receiving and storing the connection information and reduction in a consuming amount of the memory areas are realized.

Furthermore, the connection information is collectively stored in predetermined memory area in the UPS work group database 67 and can be understood only by reading the continuous memory area, so that the connection tree can be displayed very quickly.

Incidentally, the memory area reserved extra for each of the connection information may have the size previously determined or the size obtained by calculation when each of the connection information is stored. In the case of previously determining the size, for example, it can be the size capable of storing information on a prescribed number of the load devices. In the case of obtaining the size by calculation, for example, it is suitable that, based on extra power supply ability of the small UPS device 1 and power consumption of the load device set by assumption or previously set, the number of the load device which can be added is calculated within a range of the extra power supply ability to reserve the memory areas which have the size capable of storing extra information on only the number of the load devices which can be added.

Moreover, information on the prescribed load device and information on the load device used in the calculation may be tentatively written in the extra memory areas. This executes these tentative load devices to be displayed in the connection tree 69, so that extra power supply ability of the small UPS device 1 can be understood by referring to the display. Further, since the extra power supply can be understood, a connecting destination of each of the load devices can be modified or replaced so that power supply ability of a plurality of the small UPS devices 1 can be utilized maximally.

In the UPS domain controller 5, the connection information received from each of the UPS group controllers 3 and the connection information received from each of the UPS work group controllers 4 are also stored in the UPS domain database 92 according to the rules in the UPS work group controller 4 as described above.

Subsequently, the overall operation of the UPS managing system of the small UPS devices 1 having the above configurations will be explained.

The UPS group member controller 2 collects its own information, generates the group member database 47, and transmits it to the UPS group controller 3 by designating the registered IP address as the transmitting destination. The UPS group controller 3 adds the management information 104 such as the INDEX number to the received group member database 47 to generate the load device management information 101.

The UPS group controller 3 displays the screen for inputting information on the load device on the monitor 17 and generates information on the load device based on the information inputted from the keyboard 18 or the pointing device 19 under the display. Then, the UPS group controller 3 adds the management information 104 such as the INDEX number to the inputted information to generate another load device management information 101. As a result, information on, for example, the communication router 6 and the like can be registered as the load device management information 101.

Further, the UPS group controller 3 obtains from the small UPS device 1 its functions and present operating state information using the lower communication I/F 15. Then, the UPS group controller 3 generates the UPS group management information 99 and the load segment management information 100 using the obtained information.

The load segment management information 100 is generated, for example, for each of the output sockets of the small UPS devices 1, which can perform schedule operation or the like independently. In each of the load segment management information 100, the INDEX number 112 of the output socket is associated with a list of the INDEX numbers of the load devices.

The UPS group management information 99 is generated for each of the small UPS devices 1. In the UPS group management information 99, the INDEX number 107 of the small UPS device is associated with a list of the INDEX numbers of the load segment management information 100.

The group database 27 is composed of these load device management information 101, load segment management information 100, and a part of the UPS group management information 99 (=the management information 107 such as the operating state information and the INDEX number of the small UPS device 1+the list 109 of the INDEX number of the load segment management information) and stored in the internal storage medium 22. For example, a part of the information in the group database 27 such as the operating state information on the small UPS device 1 is cyclically updated.

When the simple display program 33 is started up in the UPS group controller 3, the images in FIG. 4 and FIG. 6 are displayed on the monitor 17, so that the outline of the present operating state of the small UPS device 1 can be easily understood. Further, when the group explorer 29 is started up in the UPS group controller 3, information in the group database 27 is displayed on the monitor 17, so that the detailed operating state and the like of each of the devices including the small UPS device 1 in the UPS group 11 can be understood.

Furthermore, the UPS setting/control program 32 is started up in the UPS group controller 3 so that the operation schedule and the like of the small UPS device 1 can be set. This setting information is stored in the internal storage medium 22 and the control command and the setting command are transmitted to the small UPS device 1 based on the setting information.

The small UPS device 1 is thus monitored and controlled in each of the UPS groups 11, while data in the group database 27 is transmitted from the UPS group controller 3 to the UPS work group controller 4.

The UPS work group controller 4 adds the management information 107 such as the INDEX number to a part of the received UPS group management information 99, to generate the UPS group management information 99. Then, this UPS group management information 99 is stored in the internal storage medium 57 together with the received load device management information 101 and load segment management information 100.

Moreover, the UPS work group controller 4 stores the list of the INDEX numbers added to the UPS group management information 99 in the internal storage medium 57 to generate the UPS work group database 67.

When the connection tree display program 64 is started up in the UPS work group controller 4, the UPS work group controller 4 generates the connection tree 69 of all of the devices and groups registered in the UPS work group database 67 based on the hierarchical structure of the INDEX numbers. Further, the UPS work group controller 4 selects the state image corresponding to the operating state of each of the devices and assigns it into the connection tree 69 so as to be displayed on the monitor 51.

Further, when any of the devices or groups is selected from the connection tree 69, the UPS work group controller 4 obtains the latest state information on the selected device or group using the higher communication I/F 48 and displays it in the second frame 71.

Furthermore, when the setting/control program 66 is started up in the UPS work group controller 4, the setting information or the control information is transmitted from the UPS work group controller 4 to the computer, which manages the selected device. The computer, which receives the setting information or the control information, updates setting information or outputs the control command to the device.

The small UPS devices 1 are thus monitored and controlled centrally in each of the UPS work groups 12, while data in the UPS work group database 67 is transmitted from the UPS work group controller 4 to the UPS domain controller 5.

Moreover, the UPS domain controller 5 stores the list of the INDEX numbers and the like added to the UPS work group management information 98 in the internal storage medium 83, to generate the UPS domain database 92.

When the connection tree display program 89 is started up in the UPS domain controller 5, the UPS domain controller 5 generates the connection tree 95 of all of the devices and groups registered in the UPS domain database 92 based on the hierarchical structure of the INDEX numbers. Further, the UPS domain controller 5 selects the state image corresponding to the operating state of each of the devices and assigns it into the connection tree 95 so as to be displayed on the monitor 77.

Furthermore, when any of the devices or groups is selected from the connection tree 95, the UPS domain controller 5 obtains the latest state information on the selected device or group using the higher communication I/F 74 and displays it in the display area 96.

Moreover, when the setting/control program 91 is started up in the UPS domain controller 5, the setting information or the control information is transmitted from the UPS domain controller 5 to the computer, which manages the selected device. The computer, which receives the setting information or the control information, updates setting information or outputs the control command to the device.

As described above, in the UPS managing system of the small UPS device 1 according to the embodiment of the present invention, a plurality of the small UPS devices 1 in the UPS domain 13 can be centrally monitored and controlled by one UPS domain controller 5. In addition, a plurality of the small UPS devices 1 in the UPS work group 12 can be centrally monitored and controlled by one UPS work group controller 4.

Incidentally, a deleting means may be provided in the UPS group controller 3, which notifies that the connection information transmitting means will be deleted from the higher communication I/F to the transmitting destination and then deletes the connection information transmitting means. This can execute the UPS work group controller 4 and the UPS domain controller 5 to delete or invalidate the connection information from the UPS group controller 3, whose connection information transmitting means has been deleted, and not to display it in the connection trees 69 and 95. As a result, it becomes possible to make the connection trees 69 and 95 coincide with an actual state.

Although the above-described embodiment is the preferred embodiment of the present invention, it can be suitably varied without departing from a scope of an essence of the present invention. For example, a plurality of the small UPS devices 1 are centrally monitored and controlled by the UPS work group controller 4 and the UPS domain controller 5 in the embodiment described above, but further multistage hierarchical management is possible by transmitting the UPS domain database 92 from the UPS domain controller 5 to a further higher computer, or the like. Conversely, the central monitoring and control only by the UPS work group controller 4 is also possible.

Although a plurality of the small UPS devices 1 are monitored and controlled in the above-described embodiment, the UPS managing system of the present invention can be also applied to the central monitoring and control of dispersedly installed electric devices such as, for example, intelligent tap devices and communication devices. In this case, each of the controllers may be realized on a computer different from the electric devices as in the aforesaid embodiment or may be contained in the electric device.

Although all of the UPS group controllers 3 transmit the information in the group database 27 to the UPS work group controller 4 or the UPS domain controller 5 in the embodiment described above, they may transmit the information to a different UPS group controller 3 at the same level. In this case, the different UPS group controller 3 can unify information in the received group database 27 with the information in its own group database 27 and transmit the unified information to the UPS work group controller 4 or the UPS domain controller 5. This can reduce the number of communications of the UPS work group controller 4 or the UPS domain controller 5. It becomes also possible to provide the UPS group controller 3 for each of a plurality of the small UPS devices 1 which operate collaboratively, and to display a plurality of these small UPS devices 1 in the connection tree collectively.

The UPS managing system for managing only the small UPS devices 1 connected to the power system between the wall sockets and the load devices is explained as an example in the above-described embodiment, but a large UPS 141 connected to a power supply route between an power source system 145 and wall sockets 144 may be also managed in this managing system.

In the case of managing the large UPS 141, a similar controller to the UPS group controller 3 is separately provided corresponding to the large UPS 141, and connection information and operating state information on the large UPS 141 are transmitted from the controller to the UPS domain controller 5 via the communication network, so that the large UPS 141 and its operating state can be displayed in the connection tree 95. The large UPS 141 can be also displayed in the connection tree 95 by inputting information on the large UPS 141 to the UPS domain controller 5.

Figure 23:
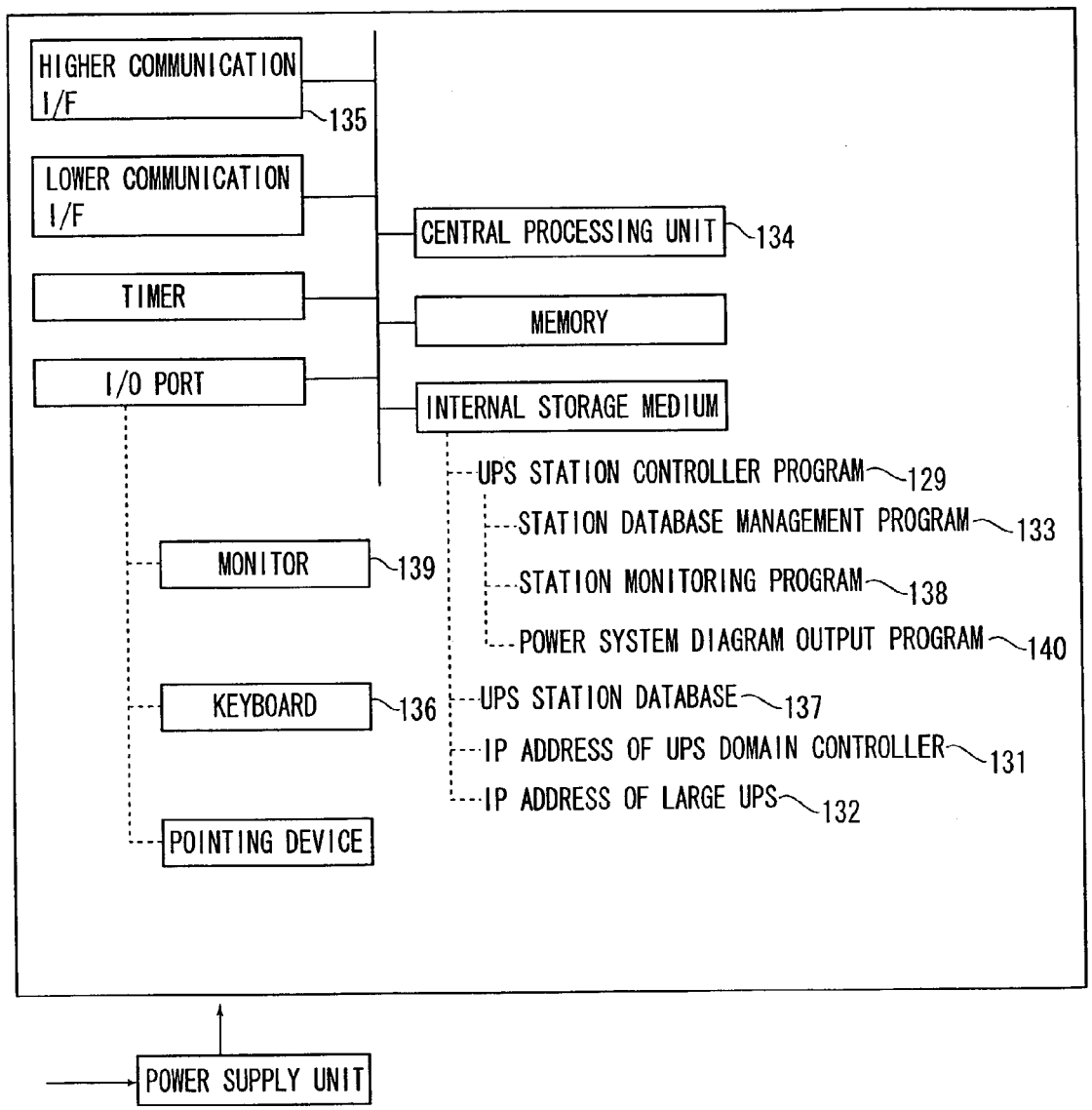
FIG. 23 is a block diagram showing an inner configuration of a UPS station controller.

Additionally, as shown in FIG. 23 for example, it is also possible to provide a UPS station controller 130, which is a general purpose computer being installed a UPS station controller program 129, for storing an IP address 131 of the UPS domain controller 5 and an IP address 132 of the large UPS 141.

This UPS station controller 130 reads the domain databases 92 from a plurality of the UPS domain controllers 5 via an higher communication I/F 135, receives the operating state information from the large UPS 141 via the higher communication I/F 135, and, when information on electric equipment devices such as panel boards 142 and 143, a breaker, and the wall sockets 144 connected to the power system between the large UPS 141 and the wall sockets 144 is inputted from a keyboard 136 or the like, stores the information in a UPS station database 137 under the control of a CPU 134 for executing a station database management program 133.

Further, under the control of the CPU 134 for executing a station monitoring program 138, the UPS station controller 130 extracts connecting relationship between the large UPS 141 and each of the electric equipment devices, connecting relationship between the electric equipment device and each of the small UPS devices 1, and connecting relationship between the small UPS device 1 and each of the load devices from the UPS station database 137, generates a connection tree including from the large UPS 141 to the load devices based on the connecting relationship, and displays it on a monitor 139.

Figure 24:
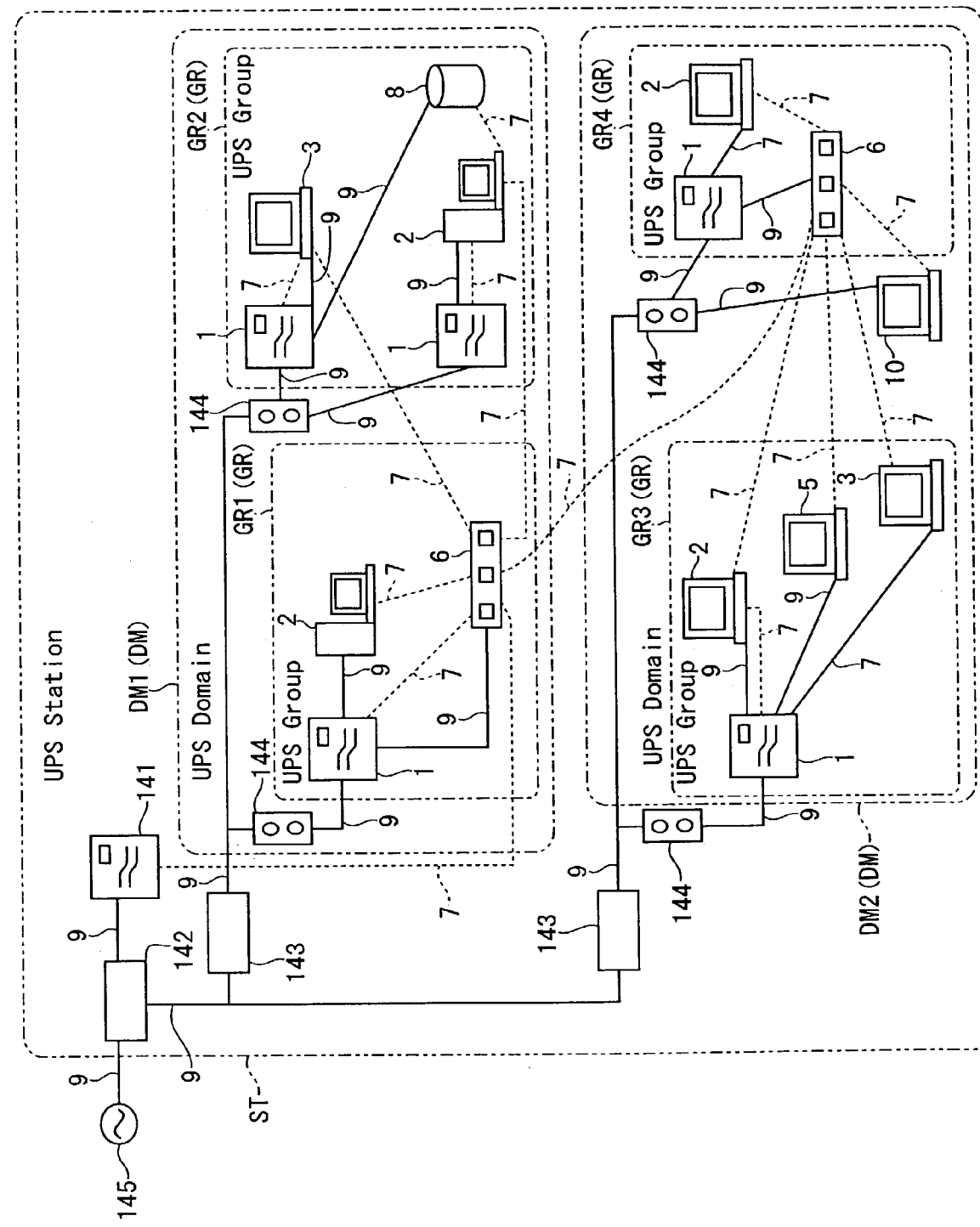
FIG. 24 is a system configuration diagram showing one example of a UPS managing system for monitoring a power system containing a large UPS.
Figure 25:
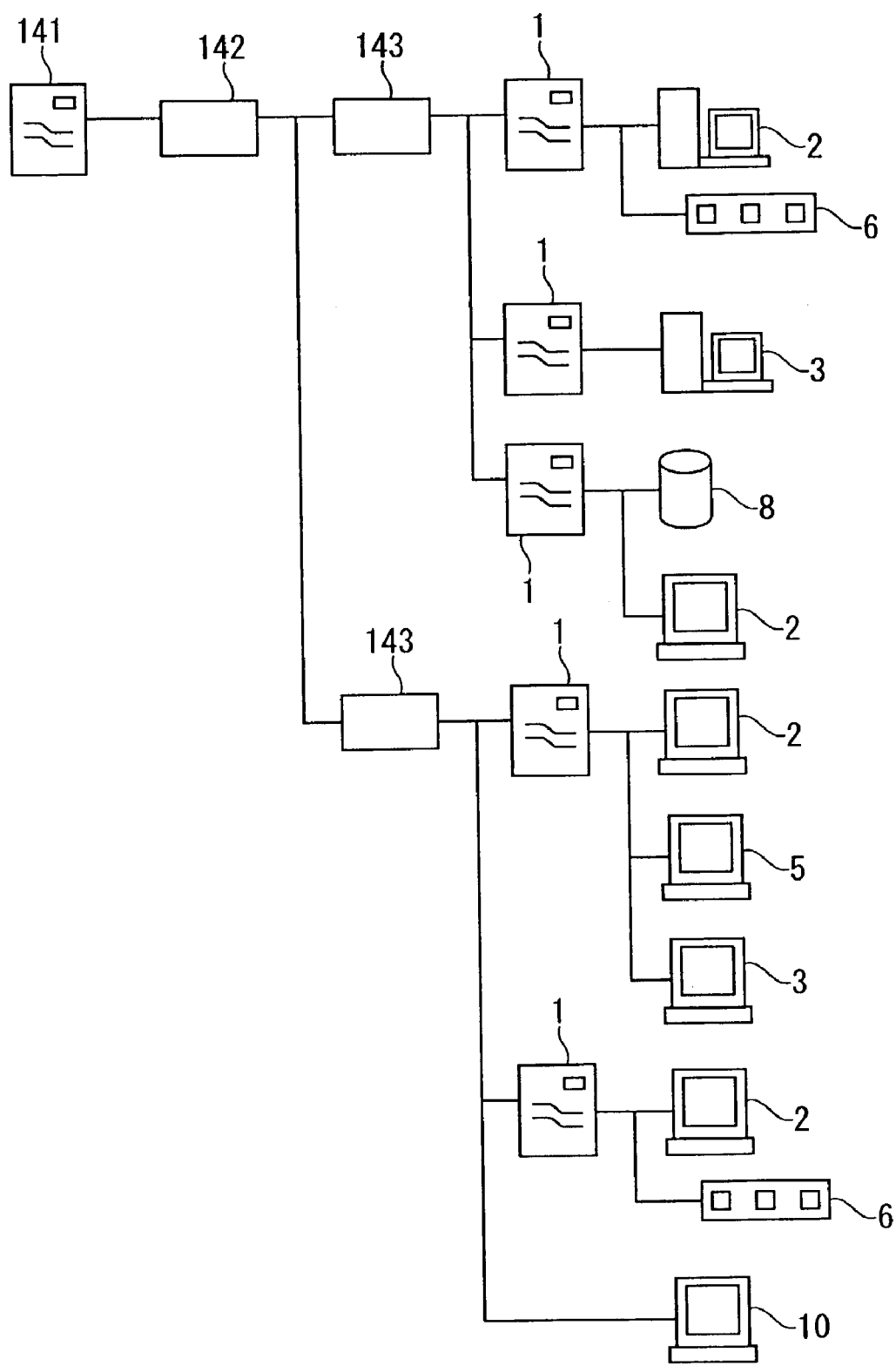
FIG. 25 is a load system diagram of the large UPS generated based on the power system in FIG. 24.

Furthermore, under the control of the CPU 134 for executing a power system diagram output program 140, the UPS station controller 130 extracts the connecting relationship between the large UPS 141 and each of the electric equipment devices, the connecting relationship between the electric equipment device and each of the small UPS devices 1, and the connecting relationship between the small UPS device 1 and each of the load devices from the UPS station database 137, and creates a power system diagram based on the connecting relationship. By using such a UPS station controller 130, in a case in which the power system includes the large UPS 141, the main panel board 142, the sub-panel boards 143, and the wall sockets 144 as shown in FIG. 24 for example, a power system diagram shown in FIG. 25 can be created.

As described above, the power system diagram is created in the UPS station controller 130 so that even those who do not know about a building or the like in which the large UPS 141 is installed or those who do not know about a state of a downstream side of a power system from the wall sockets 144 can understand the whole power system including from the large UPS 141 to the load devices.

In a case of providing such a UPS station controller 130, for example, it is particularly recommended to dispose the UPS domain controller 5 on each floor or in each room of the building in which the large UPS 141 is installed. This makes it possible to assign an operator to each floor or each room and have him/her visually check the connecting state of the power supply route from the wall sockets 144. As a result, it becomes possible, for example, to freely change a load system on each floor without a necessity to ask an administrator using the UPS station controller for the change whenever necessary.

Additionally, in the case of providing the UPS station controller 130, for example, if power consumption of a plurality of the load devices and power supply of the large UPS 141 are compared and it is judged that these power values are different each other, an alarm to notify the difference may be displayed. This enables the administrator who does not have much knowledge of the power system, to easily understand abnormality such as current leak in the power system, and repair it.

In the present invention, a plurality of the small UPS devices connected to wall sockets and whose total existence is difficult to understand, can be collected and centrally managed. In another invention, a plurality of the electric devices connected to wall sockets and whose total existence is difficult to understand, can be collected and centrally managed. Accordingly, a plurality of the small UPS devices and a plurality of the electric devices can be easily managed.

What is claimed is:

1. An Uninterrupted Power Supply (UPS) managing system for managing a plurality of small UPS devices connected to power supply routes between wall sockets and load devices, comprising:
    a plurality of lower controllers provided corresponding to each of said small UPS devices or each of groups which comprise at least two of said small UPS devices;
    a communication network for connecting a plurality of said lower 10 controllers to each other; and
    a higher controller connected to said communication network;
    wherein each of said lower controllers generates connection information between each of its corresponding small UPS device(s) and each of said load device(s) which is powered by said corresponding small UPS device(s), and transmits said connection information to said higher controller;
    wherein each of said lower controllers is registered therein destination information on said higher controller in said communication network as a transmitting destination, and transmits all of said connection information in a communication to said transmitting destination;
    wherein said higher controller receives and stores said connection information from each of said lower controllers, and generates and displays a connection tree which is generated from the stored connection information; and
    wherein said higher controller receives and stores all of said connection information in each of said communication with link information which is unique at least within a plurality of said lower controllers, stores a link list of said link information, generates said connection tree firstly by classifying each of said small UPS devices on said link information and said link list and secondary by classifying each of said load devices on said connection information, and displays said connection tree.

2. The UPS managing system according to claim 1, wherein at least one of said lower controllers is registered therein device information on said load device(s) which is/are powered by said corresponding small UPS device(s), and generates said connection information from said device information.

3. The UPS managing system according to claim 1, wherein at least one of said load devices transmits device information on itself to said lower controller which is corresponding to said small UPS device which powers it; and
    wherein said lower controller, which receives said device information, generates said connection information from said device information.

4. The UPS managing system according to claim 1, wherein at least one of said lower controllers is joined in a housing with said corresponding small UPS device.

5. The UPS managing system according to claim 1, wherein each of said lower controllers repeatedly transmits the connection information, which consists of device information on all of said corresponding small UPS devices and all of said load devices, which are powered by said corresponding small UPS devices, and
    wherein said higher controller receives and stores all of said connection information in each of said communication in a continuous memory area, which is defined at the first receiving time from each of said lower controllers and whose storage capacity is bigger than the data amount of said connection information in said first receiving time.

6. The UPS managing system according to claim 1,
    wherein at least one of said lower controllers is registered therein destination information on said lower controller in said communication network as said transmitting destination, which is selected from the other said lower controllers, and
    wherein said lower controller, which receives said connection information from said other lower controller(s), transmits in said communication both of said connection information on its corresponding small UPS device(s) and received connection information.

7. The UPS managing system according to claim 1, further comprising:
    at least a middle controller connected to said communication network;
    wherein at least two of said lower controllers are registered therein destination information on said middle controller in said communication network as said transmitting destination; and
    wherein each of said middle controller(s) transmits all of received connection information in a communication.

8. The UPS managing system according to claim 1,
    wherein each of said lower controllers repeatedly transmits operating state information on its corresponding small UPS device(s) to said registered transmitting destination; and
    wherein said higher controller receives and stores said operating state information and a plurality of display images each of which is associated with each of operating states of said small UPS device; and
    wherein said higher controller repeatedly selects one of said display images corresponding to said operating state information to display the selected display image in said connection tree.

9. The UPS managing system according to claim 1,
    wherein each of said lower controllers transmits its destination information in said communication network to said transmitting destination, and
    wherein said higher controller receives and stores said destination information, and, when one of said small UPS device is selected in said connection tree, communicates with said selected lower controller using said stored destination information to obtain operating state information or setting information on said selected lower controller, and displays said obtained information in or with said connection tree.

10. The UPS managing system according to claim 1,
    wherein each of said lower controllers transmits its destination information in said communication network to said transmitting destination,
    wherein said higher controller receives and stores said destination information, and, when one of said small UPS device is selected in said connection tree and setting information or control information is inputted, transmits said inputted information to said lower controller, which is corresponding with said selected small UPS device, using said stored destination information, and
    wherein said lower controller, which receives said inputted information, applies said inputted information to said selected small UPS device.

11. The UPS managing system according to claim 1,
wherein each of said lower controllers repeatedly transmits operating state information on its corresponding small UPS device(s) and its destination information in said communication network to said transmitting destination;
wherein said higher controller receives and stores said operating state information and said lower controller's destination information;
wherein said higher controller displays a first frame in which said connection tree is displayed, and a second frame in which operating state information, setting information and control information on said selected small UPS device in said connection tree are displayed by turns;
wherein said higher controller, when said setting information or said control information is inputted in said second frame, transmits the inputted information to said lower controller, which is corresponding with said selected small UPS device, using destination information; and
wherein said lower controller, which receives said inputted information, applies said inputted information to said selected small UPS device.

12. The UPS managing system according to claim 1,
wherein said higher controller collects or is registered therein connection information on power supply routes between power source systems and wall sockets including at least a large UPS device, and generates a power supply route diagram including said large UPS device(s), said small UPS devices, and said load devices.

* * * * *